United States Patent
Zhu

(10) Patent No.: US 11,910,017 B2
(45) Date of Patent: Feb. 20, 2024

(54) METHOD FOR PREDICTING POINT CLOUD ATTRIBUTE, ENCODER, DECODER, AND STORAGE MEDIUM

(71) Applicant: TENCENT TECHNOLOGY (SHENZHEN) COMPANY LIMITED, Shenzhen (CN)

(72) Inventor: Wenjie Zhu, Shenzhen (CN)

(73) Assignee: TENCENT TECHNOLOGY (SHENZHEN) COMPANY LIMITED, Shenzhen (CN)

(*) Notice: Subject to any disclaimer, the term of this patent is extended or adjusted under 35 U.S.C. 154(b) by 4 days.

(21) Appl. No.: 17/972,005

(22) Filed: Oct. 24, 2022

(65) Prior Publication Data

US 2023/0047400 A1   Feb. 16, 2023

Related U.S. Application Data

(63) Continuation of application No. PCT/CN2021/131346, filed on Nov. 18, 2021.

(30) Foreign Application Priority Data

Dec. 7, 2020 (CN) .................... 202011439503.0

(51) Int. Cl.
  *H04N 19/597* (2014.01)
  *H04N 19/136* (2014.01)
  *H04N 19/42* (2014.01)

(52) U.S. Cl.
  CPC ......... *H04N 19/597* (2014.11); *H04N 19/136* (2014.11); *H04N 19/42* (2014.11)

(58) Field of Classification Search
  CPC ..... H04N 19/597; H04N 19/136; H04N 19/42
  See application file for complete search history.

(56) References Cited

U.S. PATENT DOCUMENTS

2019/0081638 A1   3/2019   Mammou et al.
2020/0304823 A1   9/2020   Yea et al.

FOREIGN PATENT DOCUMENTS

| CN | 110418135 A | 11/2019 |
| CN | 110996098 A | 4/2020 |
| WO | WO2020075781 A1 | 4/2020 |
| WO | WO2020190090 A1 | 9/2020 |

OTHER PUBLICATIONS

International Search Report with English translation and Written Opinion regarding PCT/CN2021/131346 dated Jan. 26, 2022, 8 pages.

*Primary Examiner* — On S Mung
(74) *Attorney, Agent, or Firm* — Crowell & Moring LLP

(57) ABSTRACT

This application provides a method for predicting a point cloud attribute, an encoder, a decoder, and a storage medium. During point cloud attribute prediction, different selection policies for target adjacent points are designed according to the distribution of repetition points, to determine at least one target adjacent point of a target point, and attribute prediction is performed on the target point according to reconstructed attribute information of the at least one target adjacent point, thereby improving the efficiency and accuracy of point cloud attribute prediction.

20 Claims, 11 Drawing Sheets

METHOD FOR PREDICTING POINT CLOUD ATTRIBUTE, ENCODER, DECODER, AND STORAGE MEDIUM

RELATED APPLICATION

This application is a continuation application of PCT Patent Application No. PCT/CN2021/131346, filed on Nov. 18, 2021, which claims priority to Chinese Patent Application No. 202011439503.0, filed with the China National Intellectual Property Administration on Dec. 7, 2020, both of which are incorporated herein by reference in their entireties.

FIELD OF THE TECHNOLOGY

Embodiments of this application relate to the field of video encoding and decoding technologies, and in particular, to point cloud attribute prediction.

BACKGROUND OF THE DISCLOSURE

An acquisition device performs acquisition on the surface of an object to form point cloud data, and the point cloud data includes hundreds of thousands of or even more points used for expressing a surface attribute of the object. During video production, the point cloud data is transmitted between a video production device and a video playback device in the form of a point cloud media file. However, such a huge quantity of points brings challenges to the transmission, so that the video production device needs to compress the point cloud data before transmission.

The compression of the point cloud data mainly includes compression of position information and compression of attribute information. During compression of the attribute information, redundant information in the point cloud data is reduced or eliminated through prediction. For example, one or more adjacent points of a target point are acquired from encoded points, and attribute information of the target point is predicted according to attribute information of the adjacent points.

SUMMARY

The present disclosure describes a method for predicting a point cloud attribute. The method includes acquiring, by a device, N encoded points closest to a target point from point cloud data as N adjacent points of the target point, the target point being one of points in the point cloud data. The device includes a memory storing instructions and a processor in communication with the memory. The method also includes acquiring, by the device, K first-group adjacent points from the N adjacent points, the K first-group adjacent points comprising M repetition points with same position information; determining, by the device, at least one target adjacent point of the target point according to the M repetition points; and performing, by the device, attribute prediction on the target point according to reconstructed attribute information of the at least one target adjacent point, wherein each of N, K, and M is a positive integer.

The present disclosure describes an apparatus for predicting a point cloud attribute. The apparatus includes a memory storing instructions; and a processor in communication with the memory. When the processor executes the instructions, the processor is configured to cause the apparatus to perform: acquiring N encoded points closest to a target point from point cloud data as N adjacent points of the target point, the target point being one of points in the point cloud data; acquiring K first-group adjacent points from the N adjacent points, the K first-group adjacent points comprising M repetition points with same position information; determining at least one target adjacent point of the target point according to the M repetition points; and performing attribute prediction on the target point according to reconstructed attribute information of the at least one target adjacent point, wherein each of N, K, and M is a positive integer.

The present disclosure describes a non-transitory computer-readable storage medium, storing computer-readable instructions. The computer-readable instructions, when executed by a processor, are configured to cause the processor to perform: acquiring N encoded points closest to a target point from point cloud data as N adjacent points of the target point, the target point being one of points in the point cloud data; acquiring K first-group adjacent points from the N adjacent points, the K first-group adjacent points comprising M repetition points with same position information; determining at least one target adjacent point of the target point according to the M repetition points; and performing attribute prediction on the target point according to reconstructed attribute information of the at least one target adjacent point, wherein each of N, K, and M is a positive integer.

Another aspect of the embodiments of the present disclosure provides a method for predicting a point cloud attribute, an encoder, a decoder, and a storage medium, to improve the efficiency of point cloud attribute prediction.

According to a first aspect, this application provides a method for predicting a point cloud attribute, the method being performed by an encoding device, and including:
  acquiring N encoded points closest to a target point from points included in point cloud data as N adjacent points of the target point;
  acquiring K first-group adjacent points from the N adjacent points, the K first-group adjacent points including M repetition points with same position information;
  determining at least one target adjacent point of the target point according to the M repetition points; and
  performing attribute prediction on the target point according to reconstructed attribute information of the at least one target adjacent point,
  N, K, and M being all positive integers greater than or equal to 1.

According to a second aspect, this application provides a method for predicting a point cloud attribute, the method including:
  parsing a code stream, to obtain position information of each point in point cloud data;
  acquiring N decoded points closest to a target point from the point cloud data as N adjacent points of the target point according to the position information of each point in the point cloud data;
  acquiring K first-group adjacent points from the N adjacent points, the K first-group adjacent points including M repetition points with same position information;
  determining at least one target adjacent point of the target point according to the M repetition points; and
  performing attribute prediction on the target point according to reconstructed attribute information of the at least one target adjacent point,
  N, K, and M being all positive integers greater than or equal to 1.

According to a third aspect, an encoder is provided, configured to perform the method according to the first aspect or implementations thereof. Specifically, the encoder includes functional modules configured to perform the method according to the first aspect or implementations thereof.

According to a fourth aspect, a decoder is provided, configured to perform the method according to the second aspect or implementations thereof. Specifically, the decoder includes functional modules configured to perform the method according to the second aspect or implementations thereof.

According to a fifth aspect, an encoder is provided, including a processor and a memory. The memory is configured to store a computer program, and the processor is configured to invoke and run the computer program stored in the memory to perform the method according to the first aspect or implementations thereof.

According to a sixth aspect, a decoder is provided, including a processor and a memory. The memory is configured to store a computer program, and the processor is configured to invoke and run the computer program stored in the memory to perform the method according to the second aspect or implementations thereof.

According to a seventh aspect, an encoding and decoding system is provided, including the encoder according to either of the second aspect and the fifth aspect or implementations thereof, and the decoder according to either of the third aspect and the sixth aspect or implementations thereof.

According to an eighth aspect, a chip is provided, configured to implement the method according to either of the first aspect and the second aspect or implementations thereof. Specifically, the chip includes: a processor, configured to invoke a computer program from a memory and run the computer program to cause a device on which the chip is installed to perform the method according to either of the first aspect and the second aspect or implementations thereof.

According to a ninth aspect, a computer-readable storage medium is provided, configured to store a computer program, the computer program causing a computer to perform the method according to either of the first aspect and the second aspect or implementations thereof.

According to a tenth aspect, a computer program product is provided, including a computer program instruction, the computer program instruction causing a computer to perform the method according to either of the first aspect and the second aspect or implementations thereof.

According to an eleventh aspect, a computer program is provided, the computer program, when run on a computer, causing the computer to perform the method according to either of the first aspect and the second aspect or implementations thereof.

Based on the above, during point cloud attribute prediction in this application, different selection policies for target adjacent points are designed according to the distribution of repetition points, to determine at least one target adjacent point of a target point, and attribute prediction is performed on the target point according to reconstructed attribute information of the at least one target adjacent point, thereby improving the efficiency and accuracy of point cloud attribute prediction.

DESCRIPTION OF EMBODIMENTS

Figure 1:
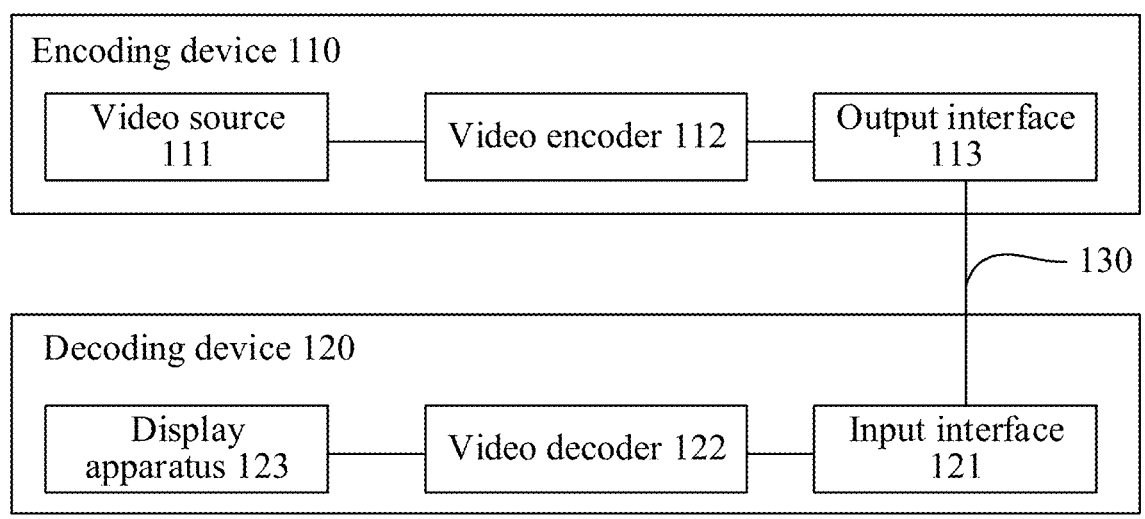
FIG. 1 is a schematic block diagram of a point cloud video encoding and decoding system according to an embodiment of this application.

Technical solutions in embodiments of this application are described below with reference to the accompanying drawings in the embodiments of this application.

It is to be understood that, in the embodiments of this application, "B corresponding to A" means that B is associated with A. In an implementation, B may be determined according to A. However, it is to be further understood that determining B according to A does not mean that B is determined according to A only, and B may also be determined according to A and/or other information.

In the description of this application, unless otherwise stated, "a plurality of" means two or more.

In addition, to clearly describe the technical solutions of the embodiments of this application, in the embodiments of this application, words such as "first" and "second" are used to distinguish the same or similar items with functions and effects that are basically the same. Those skilled in the art may understand that the words "first", "second" and the like do not limit the quantity and execution order, and the words "first", "second" and the like are not limited to be necessarily different. To facilitate the understanding of the embodiments of this application, the related concepts involved in the embodiments of this application are briefly introduced first as follows:

A point cloud is a set of discrete points that are randomly distributed in space and express the spatial structure and surface attributes of a three-dimensional (3D) object or 3D scene.

Point cloud data is a specific record form of a point cloud, and points in the point cloud may include position information and attribute information of the points. For example, the position information of the points may be 3D coordinate information of the points. The position information of the points may also be referred to as geometry information of the points. For example, the attribute information of the points may include color information and/or a reflectivity, and the like. For example, the color information may be information in any color space. For example, the color information may be red green blue (RGB) information. In another example, the color information may alternatively be YcbCr (YUV) information. For example, Y represents luma, Cb (U) represents a blue color difference, Cr (V) represents red, and U and V represent chroma, used for describing color difference information. For example, for a point cloud obtained according to a laser measurement principle, points in the point cloud may include 3D coordinate information of the points and a laser reflectance of the points. In another example, for a point cloud obtained according to a photogrammetry principle, points in the point cloud may include 3D coordinate information of the points and color information of the points. In another example, for a point cloud obtained with reference to the laser measurement principle and the photogrammetry principle, points in the point cloud may include 3D coordinate information of the points, a laser reflectance of the points, and color information of the points.

The method for acquiring point cloud data may include, but not limited to, at least one of the following: (1) Generation by a computer device. The computer device may generate point cloud data according to a virtual 3D object and a virtual 3D scene. (2) Acquisition through 3D laser scanning. Point cloud data of 3D objects or 3D scenes in the static real world can be obtained through 3D laser scanning, and millions of pieces of point cloud data can be obtained per second. (3) Acquisition through 3D photogrammetry. Visual scenes of the real world are acquired by using a 3D photography device (that is, a set of cameras or a camera device with a plurality of lenses and sensors) to obtain point cloud data of the visual scenes of the real world, and point cloud data of 3D objects or 3D scenes in the dynamic real world can be obtained through 3D photography. (4) Point cloud data of biological tissues and organs are acquired by using medical devices. In the medical field, point cloud data of biological tissues and organs can be acquired by using medical devices such as magnetic resonance imaging (MRI), computed tomography (CT), and electromagnetic positioning information.

According to the acquisition methods, point clouds can be divided into: dense point clouds and sparse point clouds.

According to time sequence types, the point clouds are divided into:
first static point clouds: that is, objects are stationary, and devices for acquiring the point clouds are also stationary;
second-type dynamic point clouds: objects are moving, but the devices for acquiring the point clouds are stationary;
third-type dynamically acquired point cloud: the devices for acquiring the point clouds are moving.

According to the use, point clouds are divided into two categories:

Category 1: machine perception point clouds. The machine perception point clouds may be applied to autonomous navigation systems, real-time inspection systems, geographic information systems, visual sorting robots, emergency rescue robots, and other scenarios.

Category 2: human eye perception point clouds. The human eye perception point clouds may be applied to digital cultural heritage, free viewpoint broadcasting, 3D immersive communication, 3D immersive interaction, and other point cloud application scenarios.

Repetition points: Due to the settings of the acquisition technology, or the application requirements during transmission and presentation, there may be a plurality of points with the same position information, and their attribute information may be the same or different. The points are defined as repetition points.

FIG. 1 is a schematic block diagram of a point cloud video encoding and decoding system according to an embodiment of this application. FIG. 1 is merely an example, and the point cloud video encoding and decoding system in this embodiment of this application includes, but not limited to, that shown in FIG. 1. As shown in FIG. 1, the point cloud video encoding and decoding system 100 includes an encoding device 110 and a decoding device 120. The encoding device is configured to encode point cloud data (which can be understood as compression) to generate a code stream, and transmit the code stream to the decoding device. The decoding device decodes the code stream generated through encoding by the encoding device to obtain decoded point cloud data.

The encoding device 110 in this embodiment of this application may be understood as a device with a video encoding function, and the decoding device 120 may be understood as a device with a video decoding function. For example, the encoding device 110 or the decoding device 120 may include a smart phone, a desktop computer, a mobile computing device, a notebook (for example, laptop) computer, a tablet computer, a set-top box, a television, a camera, a display apparatus, a digital media player, a video game console, or an in-vehicle computer.

in some embodiments, the encoding device 110 may transmit the encoded point cloud data (for example, a code stream) to the decoding device 120 through a channel 130. The channel 130 may include one or more media and/or apparatuses capable of transmitting the encoded point cloud data from the encoding device 110 to the decoding device 120.

In one example, the channel 130 includes one or more communication media that enable the encoding device 110 to transmit the encoded point cloud data directly to the decoding device 120 in real time. In this example, the encoding device 110 may modulate the encoded point cloud data according to the communication standard and transmit the modulated point cloud data to the decoding device 120. The communication media includes wireless communication media, such as a radio frequency spectrum. Optionally, the communication media may also include wired communication media, such as one or more physical transmission lines.

In another example, the channel 130 includes a storage medium. The storage medium can store point cloud data encoded by the encoding device 110. Storage media include a variety of locally accessible data storage media such as an optical disc, a DVD, and a flash memory. In this example, the decoding device 120 may acquire the encoded point cloud data from the storage medium.

In another example, the channel 130 may include a storage server. The storage server may store point cloud data encoded by the encoding device 110. In this instance, the decoding device 120 may download the stored encoded point cloud data from the storage server. Optionally, the storage server may store the encoded point cloud data and may transmit the encoded point cloud data to the decoding device 120, and may be a web server (for example, used for a website), a file transfer protocol (FTP) server, or the like.

In some embodiments, the encoding device 110 includes a video encoder 112 and an output interface 113. The output interface 113 may include a modulator/demodulator (modem) and/or a transmitter.

In some embodiments, in addition to the video encoder 112 and the output interface 113, the encoding device 110 may further include a video source 111.

The video source 111 may include at least one of a video acquisition apparatus (for example, a video camera), a video archive, a video input interface, and a computer graphics system. The video input interface is configured to receive point cloud data from a video content provider, and the computer graphics system is configured to generate point cloud data.

The video encoder 112 encodes the point cloud data from the video source 111 to generate a code stream. The video encoder 112 directly/indirectly transmits the encoded point cloud data to the decoding device 120 through the output interface 113. The encoded point cloud data may also be stored on a storage medium or a storage server for subsequent reading by the decoding device 120.

In some embodiments, the decoding device 120 includes an input interface 121 and a video decoder 122.

In some embodiments, in addition to the input interface 121 and the video decoder 122, the decoding device 120 may further include a display apparatus 123.

The input interface 121 includes a receiver and/or a modem. The input interface 121 can receive the encoded point cloud data through the channel 130.

The video decoder 122 is configured to: decode the encoded point cloud data to obtain decoded point cloud data, and transmit the decoded point cloud data to the display apparatus 123.

The display apparatus 123 displays the decoded point cloud data. The display apparatus 123 may be integrated with the decoding device 120 or be outside the decoding device 120. The display apparatus 123 may include a plurality of types of display apparatuses such as a liquid crystal display (LCD), a plasma display, an organic light-emitting diode (OLED) display, or a display apparatus of another type.

In addition, FIG. 1 is merely an example, and the technical solutions of the embodiments of this application are not limited to FIG. 1. For example, the technology of this application may alternatively be applied to single-side video encoding or single-side video decoding.

Because the point cloud is a set of massive points, storing the point cloud not only consume a lot of memory, but also be not conducive to transmission, and there is no such a large bandwidth to support the point cloud to be transmitted directly at a network layer without compression. Therefore, it is necessary to compress the point cloud.

In the related art, point clouds are compressed through a point cloud encoding framework.

The point cloud encoding framework may be the geometry point cloud compression (G-PCC) encoding and decoding framework or the video point cloud compression (V-PCC) framework provided by the moving picture experts group (MPEG), or may be the AVS-PCC encoding and decoding framework provided by the audio video standard (AVS) organization. Both G-PCC and AVS-PCC are aimed at static sparse point clouds, and encoding frameworks are roughly the same. The G-PCC encoding and decoding framework may be used for compressing the first static point clouds and the third-type dynamically acquired point clouds, and the V-PCC encoding and decoding framework may be used for compressing the second-type dynamic point clouds. The G-PCC encoding and decoding framework is also referred to as a point cloud codec TMC13, and the V-PCC encoding and decoding framework is also referred to as a point cloud codec TMC2.

The encoding and decoding framework applicable to this embodiment of this application is described below by using the G-PCC encoding and decoding framework.

Figure 2:
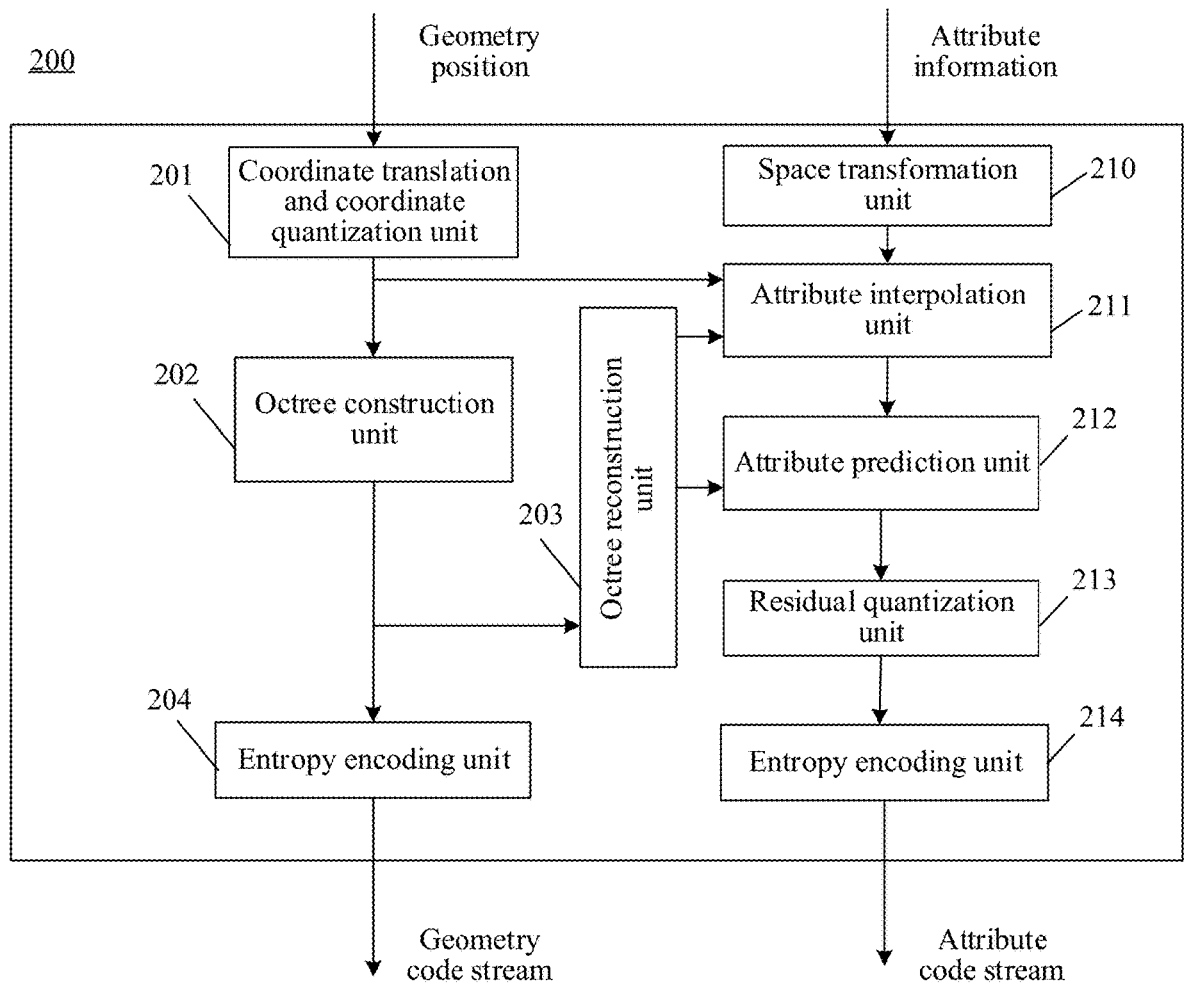
FIG. 2 is a schematic block diagram of an encoding framework according to an embodiment of this application.

FIG. 2 is a schematic block diagram of an encoding framework according to an embodiment of this application.

As shown in FIG. 2, the encoding framework 200 may acquire position information (which is also referred to as geometry information or geometry position) and attribute information of point cloud from an acquisition device. Encoding of the point cloud includes position encoding and attribute encoding.

The process of position encoding includes: performing preprocessing such as coordinate transformation and quantization and removal of repetition points on the original point cloud; and performing encoding after establishing an octree, to form a geometry code stream.

The attribute encoding process includes: by giving real values of the reconstructed information of the position information and the attribute information of the inputted point cloud, one of the three prediction modes is selected for point cloud prediction, the predicted results are quantified, and arithmetic coding is performed to form an attribute code stream.

As shown in FIG. 2, position encoding may be implemented by the following units:

a coordinate translation and coordinate quantization unit 201, an octree construction unit 202, an octree reconstruction unit 203, and an entropy encoding unit 204.

The coordinate translation and coordinate quantization unit 201 may be configured to: transform world coordinates of the points in the point cloud into relative coordinates, and quantize the coordinates, which can reduce the quantity of coordinates. After quantization, points that are originally different may be assigned the same coordinates.

The octree construction unit 202 may encode position information of the quantized points in an octree encoding manner. For example, the point cloud is divided in the form of an octree, so that positions of the points may be in a one-to-one correspondence with the positions of the octree. By collecting statistics on the positions in the octree in which points exist, and recording flags thereof as 1, geometry encoding is performed.

The octree reconstruction unit 203 is configured to reconstruct the geometry positions of the points in the point cloud to obtain reconstructed geometry positions of the points.

The entropy encoding unit 204 may perform arithmetic coding on the position information outputted by the octree construction unit 202 in an entropy encoding manner, that is, generate a geometry code stream in an arithmetic coding manner by using the position information outputted by the octree construction unit 202. The geometry code stream may also be referred to as geometry bitstream.

Attribute encoding may be implemented by the following units:

a space transformation unit 210, an attribute interpolation unit 211, an attribute prediction unit 212, a residual quantization unit 213, and an entropy encoding unit 214.

The space transformation unit 210 may be configured to transform an RGB color space of the points in the point cloud into the YCbCr format or other formats.

The attribute interpolation unit 211 may be configured to transform the attribute information of the points in the point cloud to minimize attribute distortion. For example, the attribute interpolation unit 211 may be configured to obtain a real value of the attribute information of the point. For example, the attribute information may be color information of the point.

The attribute prediction unit 212 may be configured to predict the attribute information of the point in the point cloud to obtain the predicted value of the attribute information of the point, and then obtain a residual value of the attribute information of the point based on the predicted value of the attribute information of the point. For example, the residual value of the attribute information of the point may be obtained by subtracting the predicted value of the attribute information of the point from the real value of the attribute information of the point.

The residual quantization unit 213 may be configured to quantize residual values of attribute information of points.

The entropy encoding unit 214 may perform entropy encoding on the residual values of the attribute information of the points through zero run length coding, to obtain an attribute code stream. The attribute code stream may be bitstream information.

With reference to FIG. 2, the main operations and processing for geometry structure encoding in this application are as follows:

(1) Pre-processing: including transforming coordinates and voxelization. The point cloud data in the 3D space is transformed into an integer form through zooming and translation operations, and the minimum geometry position thereof is moved to the coordinate origin.

(2) Geometry encoding: Geometry encoding includes two modes, which can be used under different conditions.

(a) Octree-based geometry encoding: The octree is a tree-shaped data structure. In 3D space division, a preset bounding box is evenly divided, and each node has eight child nodes. By using '1' and '0' to indicate whether each child node of the octree is occupied or not, occupancy code information is obtained as a code stream of geometry information of the point cloud.

(b) Trisoup-based geometry encoding: The point cloud is divided into blocks of a certain size, intersections at the edges of the blocks on the surface of the point cloud are located, and a triangle is constructed. Compression of geometry information is implemented by encoding intersection positions.

(3) Geometry quantization: The fineness of quantization is usually determined by a quantization parameter (QP). A larger value of QP indicates that coefficients with a larger value range will be quantized into the same output, and consequently, greater distortion and a lower code rate are usually caused. On the contrary, a relatively small value of QP indicates that coefficients with a relatively small value range will be quantized into the same output, so that less distortion is usually caused, which corresponds to a relatively high bit rate. In point cloud encoding, quantization is performed directly on the coordinate information of points.

(4) Geometry entropy encoding: Statistical compression encoding is performed for the occupancy code information of the octree, and finally a binarized (0 or 1) compressed code stream is outputted. Statistical encoding is a lossless encoding manner that can effectively reduce the code rate required to express the same signal. A commonly used statistical encoding manner is content adaptive binary arithmetic coding (CABAC).

For attribute information encoding, the main operations and processing are as follows:

(1) Attribute recoloring: In the case of lossy encoding, after the geometry information is encoded, the encoder side needs to decode and reconstruct the geometry information, that is, restore the coordinate information of each point in the 3D point cloud. The attribute information corresponding to one or more adjacent points in the original point cloud is found as the attribute information of the reconstructed point.

(2) Attribute prediction encoding: During attribute prediction encoding, one or more points are selected as predicted values based on the adjacent relationship for the geometry information or attribute information, a weighted average is calculated to obtain a final attribute predicted value, and a difference between the real value and the predicted value is encoded.

(3) Attribute transform encoding: There are three modes in attribute transform encoding, which can be used under different conditions.

(a) Predicting transform encoding: A sub-point set is selected according to distances, and the point cloud is divided into a plurality of different levels (level of detail, (LoD)), to realize point cloud representations from rough to fine. Bottom-top prediction can be implemented between adjacent layers. That is, the attribute information of the points introduced in the fine layer is predicted from the adjacent points in the rough layer, and a corresponding residual signal is obtained. Points at the lowest layer are used as reference information for encoding.

(b) Lifting Transform encoding: Based on LoD adjacent layer prediction, the weight update policy of neighborhood points is introduced, and finally the predicted attribute value of each point is obtained, and a corresponding residual signal is obtained.

(c) Region adaptive hierarchical transform (RAHT) encoding: After RAHT is performed on the attribute information, the signal is transformed into a transform domain, which is referred to as a transform coefficient.

(4) Attribute information quantization: The fineness of quantization is usually determined by the QP. In predicting transform encoding and lifting transform encoding, entropy encoding is performed after residual values are quantized; and in RAHT, entropy encoding is performed after transform coefficients are quantized.

(5) Attribute entropy coding: Final compression of the quantized attribute residual signal or transform coefficient is generally implemented through run length coding and arithmetic coding. Corresponding encoding modes, the QP, and other information are also encoded by using an entropy encoder.

Figure 3:
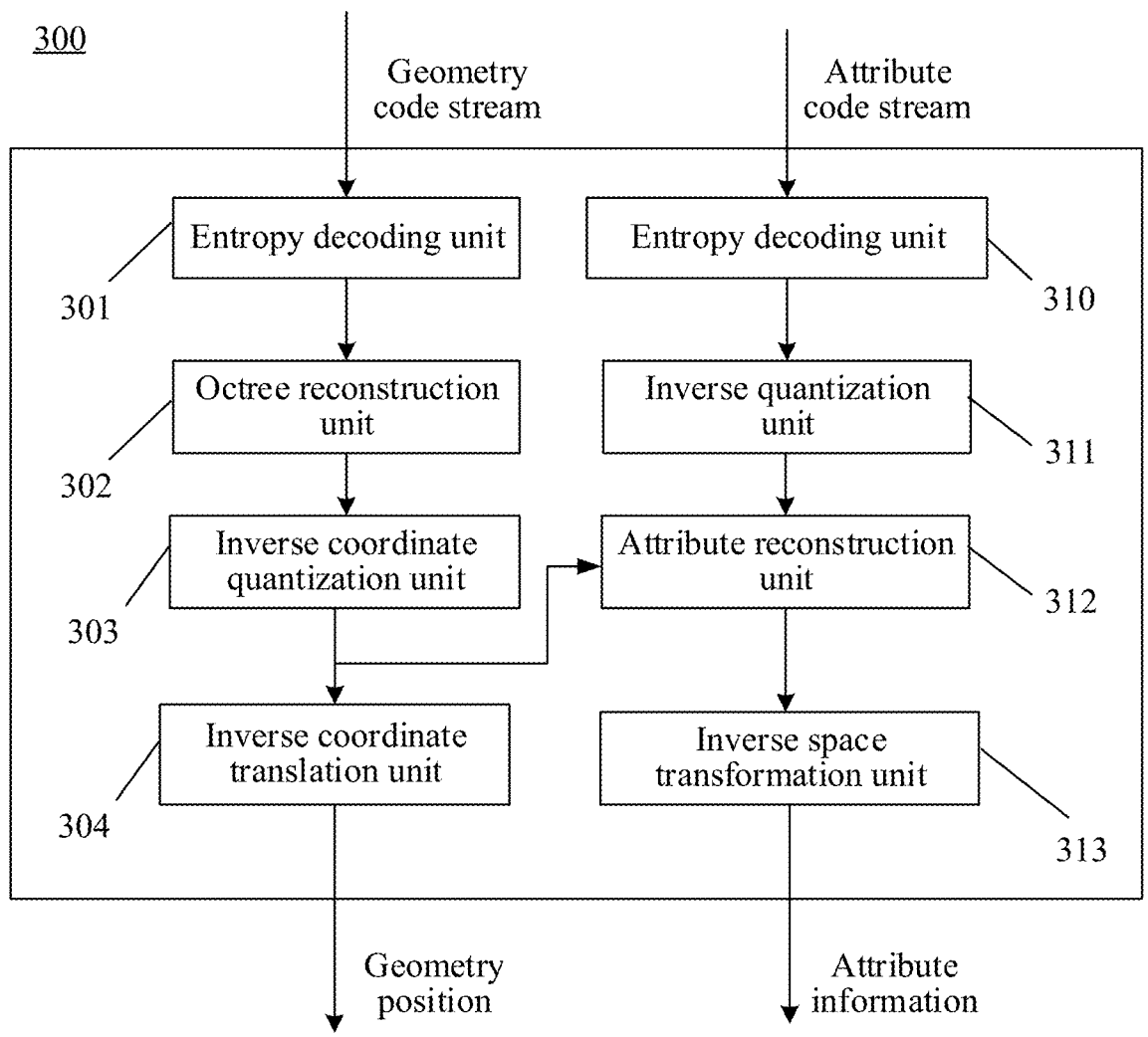
FIG. 3 is a schematic block diagram of a decoding framework according to an embodiment of this application.

FIG. 3 is a schematic block diagram of a decoding framework according to an embodiment of this application.

As shown in FIG. 3, the decoding framework 300 may obtain a code stream of the point cloud from the encoding device, and obtain the position information and attribute information of the points in the point cloud by parsing the code stream. The decoding of the point cloud includes position decoding and attribute decoding.

The process of position decoding includes: performing arithmetic decoding on the geometry code stream; performing combination after constructing an octree, and reconstructing the position information of the points, to obtain reconstructed information of the position information of the points; and performing coordinate transformation on the reconstructed information of the position information of the points to obtain the position information of the points. The position information of the points may also be referred to as geometry information of the points.

The attribute decoding process includes: parsing the attribute code stream to obtain residual values of the attribute information of the points in the point cloud; performing inverse quantization on the residual values of the attribute information of the points, to obtain residual values of the attribute information of the points after inverse quantization;

selecting one of the three prediction modes to perform point cloud prediction based on the reconstructed information of the position information of the points obtained during position decoding, to obtain reconstructed values of the attribute information of the points; and performing color space inverse transformation on the reconstructed values of the attribute information of the points, to obtain the decoded point cloud.

As shown in FIG. 3, position decoding may be implemented by the following units:

an entropy decoding unit 301, an octree reconstruction unit 302, an inverse coordinate quantization unit 303, and an inverse coordinate translation unit 304.

Attribute encoding may be implemented by the following units:

an entropy decoding unit 310, an inverse quantization unit 311, an attribute reconstruction unit 312, and an inverse space transformation unit 313.

Decompression is an inverse process of compression, and similarly, for the functions of each unit in the decoding framework 300, reference may be made to the functions of the corresponding unit in the encoding framework 200.

At the decoder side, after obtaining a compressed code stream, the decoder first performs entropy decoding to obtain various mode information, and quantized geometry information and attribute information. First, inverse quantization is performed on the geometry information to obtain reconstructed 3D point position information. On the other hand, inverse quantization is performed on the attribute information to obtain residual information, and a reference signal is confirmed according to the adopted transformation mode, to obtain reconstructed attribute information, which has a one-to-one correspondence with the geometry information in sequence, and outputted reconstructed point cloud data is generated.

For example, the decoding framework 300 may divide the point cloud into a plurality of LoDs according to the Euclidean distance between the points in the point cloud; and subsequently decode the attribute information of the points in the LoD in sequence, for example, calculate a quantity of zeros (zero_cnt) in the zero run length coding technology, to decode residuals based on zero_cnt. Subsequently, the decoding framework 300 may perform inverse quantization based on decoded residual values, and add the residual values after inverse quantization to the predicted value of the target point to obtain reconstructed values of the point cloud, until all point clouds have been decoded. The target point will serve as the nearest neighbor of subsequent points in the LoDs, and the reconstructed value of the target point is used to predict the attribute information of the subsequent points.

In the point cloud datasets of MPEG and AVS, there are a plurality of datasets including repetition points, and the proportion of repetition points is 10% to 50%. However, there may be repetition points with the same position information in the point cloud data. In the attribute prediction method in the related art, the influence of repetition points in the prediction is not considered, especially under the condition of lossless encoding, which leads to low prediction efficiency. This application provides a method for predicting a point cloud attribute, in which different selection policies for adjacent points are designed during prediction according to the distribution of repetition points, to improve the efficiency of point cloud attribute prediction.

The technical solution of this application is described below in detail.

The method for predicting a point cloud attribute provided in the embodiments of this application is described first by using an encoder side as an example.

Figure 4:
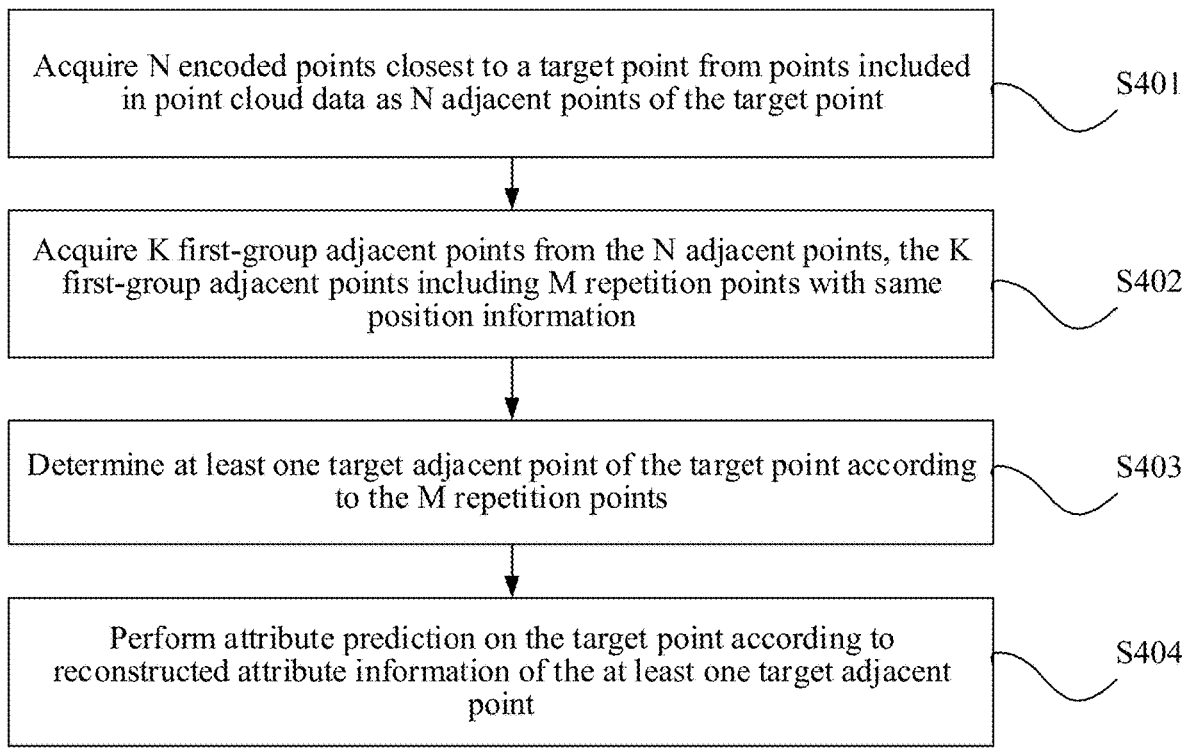
FIG. 4 is a flowchart of a method for predicting a point cloud attribute according to an embodiment of this application.

FIG. 4 is a flowchart of a method for predicting a point cloud attribute according to an embodiment of this application. The execution entity of the method is the foregoing encoding device, for example, the encoding device 110. As shown in FIG. 4, the method includes the following steps:

S401: Acquire N encoded points closest to a target point from points included in point cloud data as N adjacent points of the target point.

In this embodiment, the encoding of the attribute information of the point cloud is performed after the encoding of the position information.

In some embodiments, adjacent points whose attribute information has been encoded in the point cloud data are acquired, distances between the encoded adjacent points and the target point are calculated, and N adjacent points with a distance to the target point falling within a predetermined distance range are selected from the encoded adjacent points according to the distances as N adjacent points of the target point. The N adjacent points within the predetermined distance range are the first N adjacent points with the closest distance obtained by comparing the distances between the adjacent points and the target point. The target point is one of the points included in the point cloud data.

The attribute information of the target point includes a color attribute and/or a reflectivity attribute.

Figure 5A:
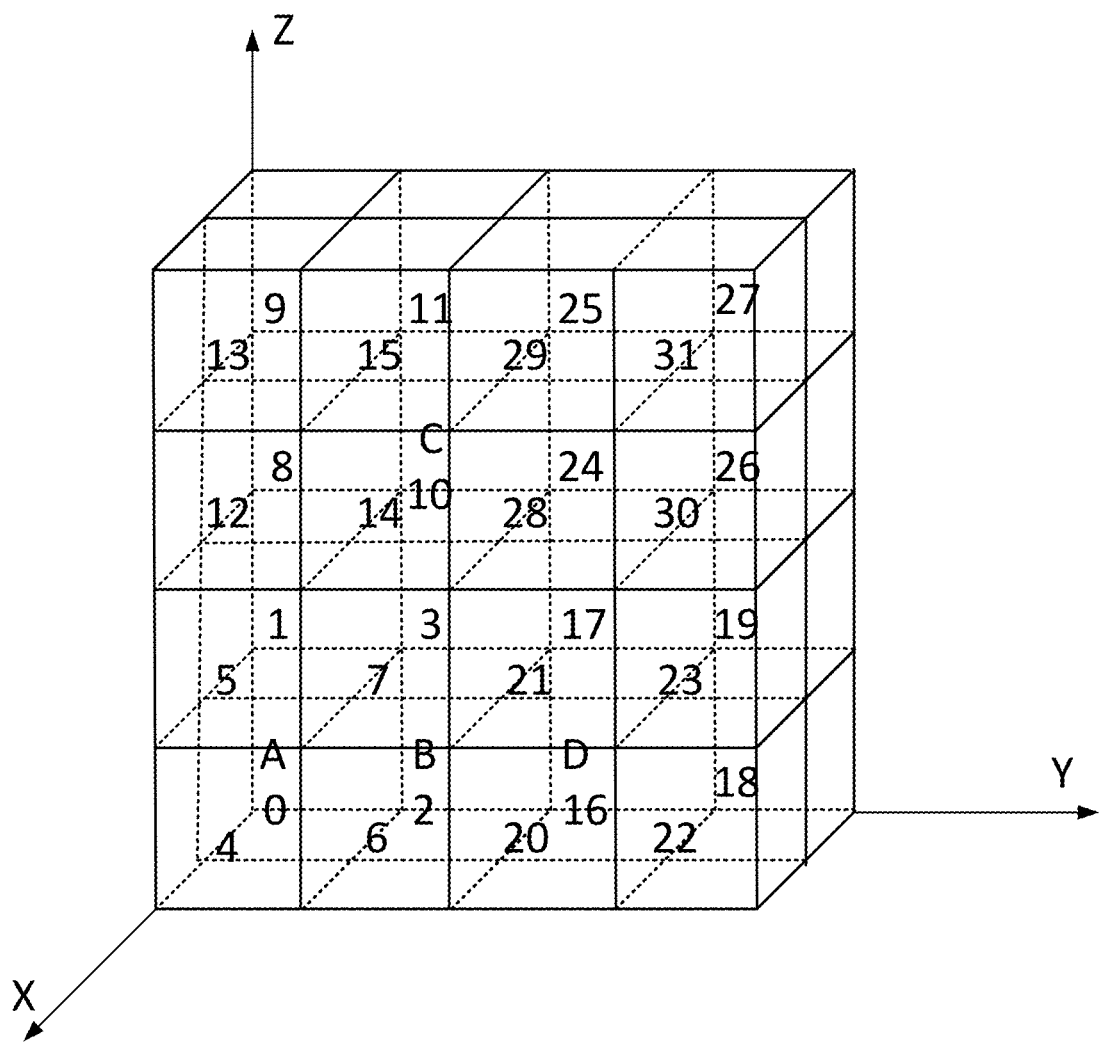
FIG. 5A is a schematic diagram of sorting of a point cloud in an original Morton order.

In some embodiments, if the attribute information of the target point is reflectivity information, manners of the acquiring N encoded points closest to a target point from point cloud data as N adjacent points of the target point in S401 include, but not limited to, the following manners:

Manner 1: When the reflectivity attribute of the target point is predicted, the Morton order may be used to select the N adjacent points of the target point, which is specifically:

Coordinates of all point clouds in the point cloud data are obtained, and a Morton order 1 is obtained according to Morton sorting, as shown in FIG. 5A.

Figure 5B:
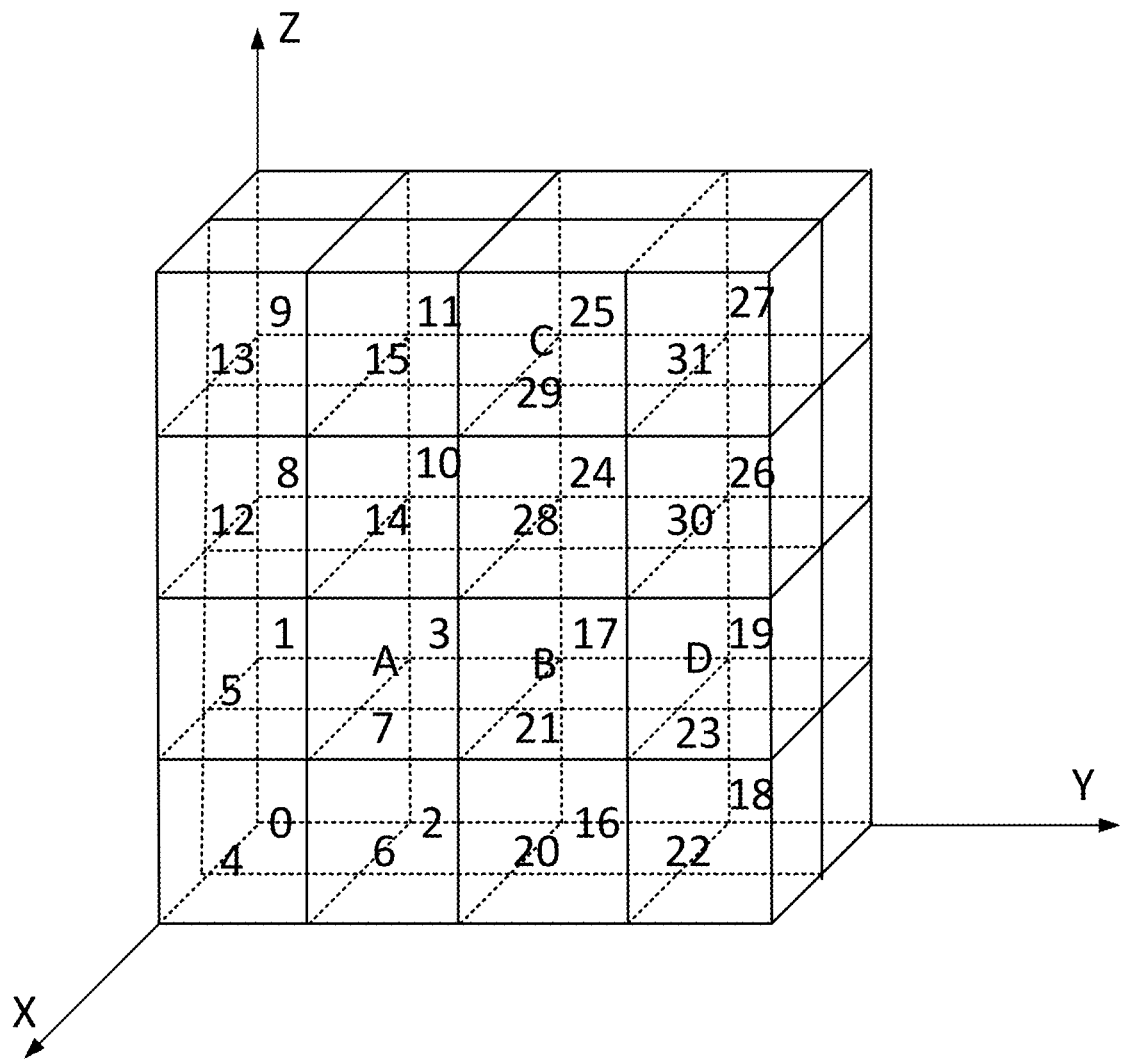
FIG. 5B is a schematic diagram of sorting of a point cloud in an offset Morton order.

Subsequently, a fixed value (j1, j2, j3) is added to the coordinates (x, y, z) of all point clouds, the new coordinates (x+j1, y+j2, z+j3) are used to generate Morton codes corresponding to the point clouds, and a Morton order 2 is obtained according to Morton sorting, as shown in FIG. 5B. When A, B, C, and D in FIG. 5A move to different positions in FIG. 5B, the corresponding Morton codes also change, but their relative positions remain unchanged. In addition, in FIG. 5B, the Morton code of the point D is 23, and the Morton code of its adjacent point B is 21, so that the point B can be found by searching two points forward from the point D at most. However, in FIG. 5A, the point B (Morton code 2) can only be found by searching forward at most 14 points from the point D (Morton code 16).

Encoding is performed according to the Morton order, and the nearest predicted points of the target point are searched. The first N1 encoded points of the target point are selected from Morton order 1 as N1 adjacent points of the target point, where N1 is greater than or equal to 1; the first N2 encoded points of the target point are selected from Morton order 2 as N2 adjacent points of the target point, where N2 is greater than or equal to 1, and N1+N2=N; and then N adjacent points of the target point are obtained.

Optionally, in PCEM software, j1=j2=j3=42, and N1=N2=4.

Manner 2: The first maxNumOfNeighbours encoded points of the target point in the Hilbert order are calculated, and the maxNumOfNeighbours encoded points are used as N adjacent points of the target point.

Optionally, the default value of maxNumOfNeighbours is 128.

Figure 5C:
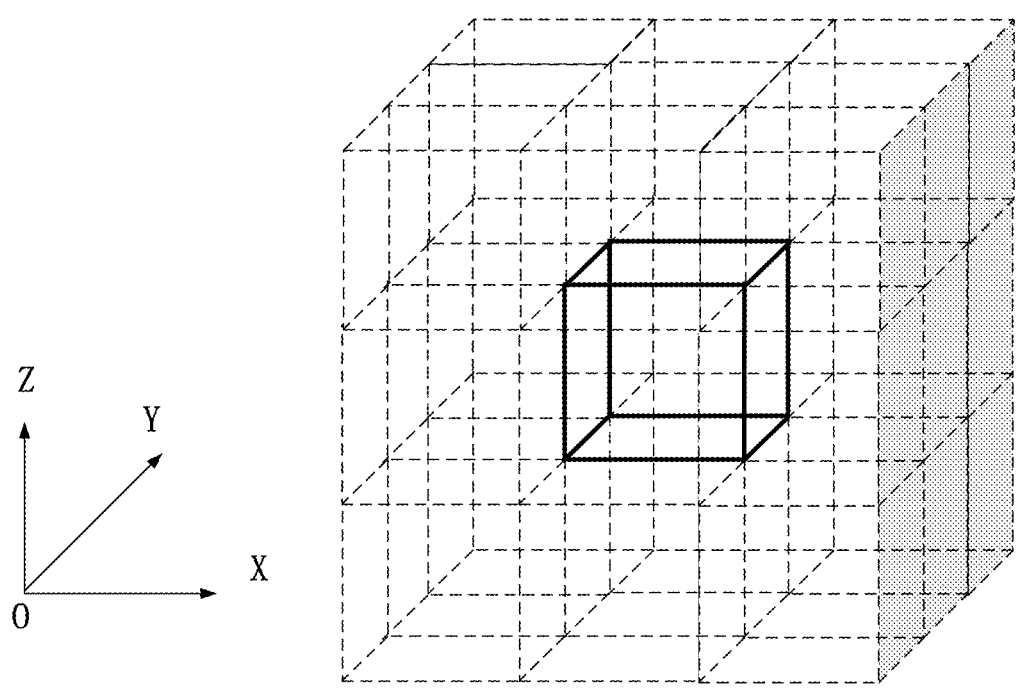
FIG. 5C is a schematic diagram of a spatial relationship between adjacent points of a target point.
Figure 5D:
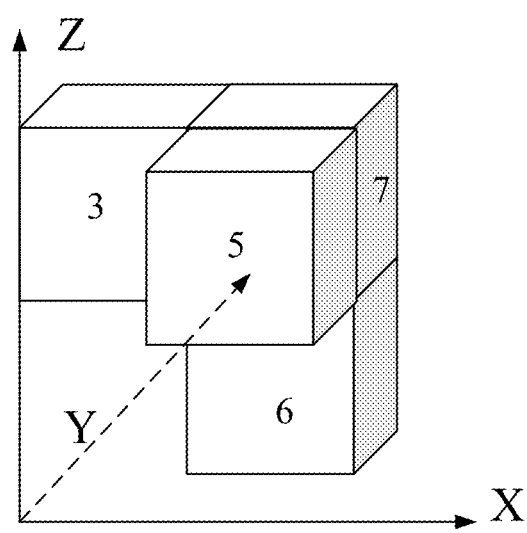
FIG. 5D is a schematic diagram of a Morton code relationship between adjacent points coplanar with a target point.
Figure 5E:
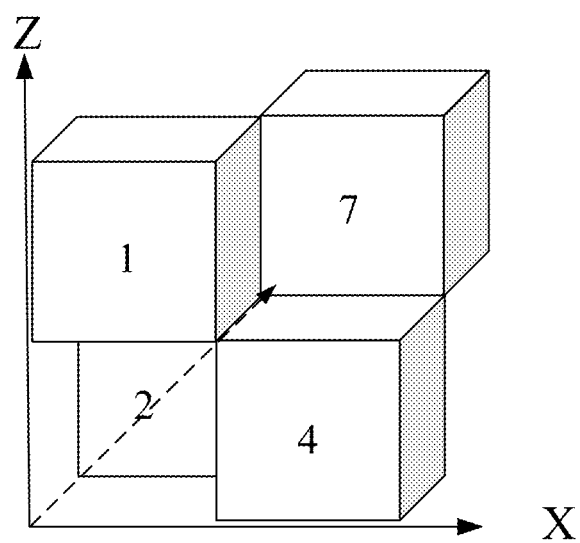
FIG. 5E is a schematic diagram of a Morton code relationship between adjacent points collinear with a target point.

In some embodiments, if the attribute information of the target point is color information, the manner of the acquiring N encoded points closest to a target point from point cloud data as N adjacent points of the target point in S401 includes:

A spatial relationship between the adjacent points of the target point is shown in FIG. 5C, in which the solid line box represents the target point, and it is assumed that the search range of the adjacent points is the 3×3×3 neighborhood of the target point. Firstly, the Morton code of the target point is used to obtain the block with the smallest Morton code value in the 3×3×3 neighborhood, and the block is used as a reference block. Encoded adjacent points that are coplanar and collinear with the target point are searched for by using the reference block. A Morton code relationship between adjacent points that are coplanar with the target point in the neighborhood range is shown in FIG. 5D, and the Morton code relationship between adjacent points that are collinear with the target point is shown in FIG. 5E below.

The reference block is used to search for N encoded adjacent points that are coplanar and collinear with the target point, and an attribute of the target point is predicted by using the N adjacent points.

If no encoded adjacent point that is coplanar and collinear with the target point is found, attribute prediction is performed using a point corresponding to the previous Morton code of the target point.

S402: Acquire K first-group adjacent points from the N adjacent points, the K first-group adjacent points including M repetition points with same position information.

In the present disclosure, a first-group adjacent point may be referred as a first adjacent point; and/or first-group adjacent points may be referred as first adjacent points.

In a possible implementation of S402, K first-group adjacent points are randomly obtained from the N adjacent points.

In another possible implementation of S402, a distance d between each of the N adjacent points and the target point is calculated according to the position information of each of the N adjacent points and the position information of the target point. For example, the coordinates of the target point are (x, y, x), the coordinates of a candidate point are (x1, y1, z1), and the calculation method of the distance d is d=|x−x1|+|y−y1|+|z−z1|. Optionally, in this application, other distance calculation methods may alternatively be adopted to calculate the distance between each adjacent point and the target point. First K adjacent points with the shortest distance d in the N adjacent points are used as the K first-group adjacent points. M repetition points with same position information exist in the K first-group adjacent points.

S403: Determine at least one target adjacent point of the target point according to the M repetition points.

In some related technologies, prediction of the attribute information of the target point is performed by using the K first-group adjacent points obtained in S403 as the target adjacent points of the target point. However, in this application, in consideration of the influence of the M repetition points in the K first-group adjacent points on the attribute information prediction of the target point, at least one target adjacent point of the target point is determined based on the M repetition points, thereby improving the efficiency of attribute information prediction of the target point.

In this step, the implementation process of determining at least one target adjacent point of the target point according to the M repetition points includes, but not limited to, the following manners:

In a first implementation, S403 includes S403-A1 and S403-A2:

S403-A1: Determine one third-group adjacent point from the M repetition points.

S403-A2: Use the third-group adjacent point as one target adjacent point of the target point.

In the present disclosure, a third-group adjacent point may be referred as a third adjacent point; and/or third-group adjacent points may be referred as third adjacent points.

The third-group adjacent point may be any one of the M repetition points. Because the position information of the M repetition points is the same, but the attribute information thereof may be the same or different, the attribute information of the third-group adjacent point may be determined in the following manner:

In one manner, an attribute value of any one of the M repetition points is used as an attribute value of the third-group adjacent point.

In another manner, an average value of attribute values of all the M repetition points is used as an attribute value of the third-group adjacent point.

In some embodiments of the first manner, the video encoder may further use K−M first-group adjacent points other than the M repetition points in the K first-group adjacent points as K−M target adjacent points of the target point.

Further, to make the quantity of target adjacent points of the target point be K, this embodiment of this application further includes:

S403-A3: Select M−1 second-group adjacent points from the N adjacent points, the second-group adjacent points being different from the first-group adjacent points.

S403-A4: Use the M−1 second-group adjacent points as M−1 target adjacent points of the target point.

In the present disclosure, a second-group adjacent point may be referred as a second adjacent point; and/or second-group adjacent points may be referred as second adjacent points.

In some implementations, each point in the M−1 second-group adjacent points may be different from each point in the K first-group adjacent points.

In other words, M−1 second-group adjacent points are selected from the remaining adjacent points other than the K first-group adjacent points in the N adjacent points, and the M−1 second-group adjacent points are used as M−1 target adjacent points of the target point. The M−1 second-group adjacent points may include repetition points or may not include repetition points, which is not limited in this application.

The implementations of S403-A3 include, but not limited to, the following manners:

Manner 1: M−1 adjacent points are randomly selected from N−K adjacent points other than the K first-group adjacent points in the N adjacent points as second-group adjacent points.

Manner 2: M−1 adjacent points closest to the target point are selected from N−K adjacent points as the M−1 second-group adjacent points, the N−K adjacent points being adjacent points other than the K first-group adjacent points in the N adjacent points.

In a second implementation, if each point in the point cloud data includes time information, S403 includes S403-B1:

S403-B1: Select P repetition points with the same time information as the target point from the M repetition points as target adjacent points of the target point, P being a positive integer.

Based on S403-B1, to make the total quantity of the target adjacent points of the target point be K, this application may further include S403-B2:

S403-B2: Select M–P fourth-group adjacent points from the N adjacent points as M–P target adjacent points of the target point, the fourth-group adjacent point being different from the first-group adjacent point.

In the present disclosure, a fourth-group adjacent point may be referred as a fourth adjacent point; and/or fourth-group adjacent points may be referred as fourth adjacent points.

In other words, M–P fourth-group adjacent points are selected from the remaining adjacent points other than the K first-group adjacent points in the N adjacent points, and the M–P fourth-group adjacent points are used as M–P target adjacent points of the target point. The M–P fourth-group adjacent points may include repetition points or may not include repetition points, which is not limited in this application.

The implementations of S403-B2 include, but not limited to, the following manners:

Manner 1: M–P adjacent points are randomly selected from N–K adjacent points other than the K first-group adjacent points in the N adjacent points as second-group adjacent points.

Manner 2: M–P adjacent points closest to the target point are selected from N–K adjacent points as the M–P fourth-group adjacent points, the N–K adjacent points being adjacent points other than the K first-group adjacent points in the N adjacent points.

In a third implementation, S403 includes S403-C1:

S403-C1: Use first-group adjacent points other than the M repetition points in the K first-group adjacent points as K–M target adjacent points of the target point. In other words, the M repetition points are removed.

Based on S403-C1, this application may further include S403-C2:

S403-C2: Select M adjacent points from N–K adjacent points as M target adjacent points of the target point, the N–K adjacent points being adjacent points other than the K first-group adjacent points in the N adjacent points.

The implementations of S403-C2 include, but not limited to, the following manners:

Manner 1: M adjacent points are randomly selected from N–K adjacent points other than the K first-group adjacent points in the N adjacent points as M target adjacent points of the target point.

Manner 2: M adjacent points closest to the target point are selected from N–K adjacent points as M target adjacent points of the target point, the N–K adjacent points being adjacent points other than the K first-group adjacent points in the N adjacent points.

In a fourth implementation, S403 includes S403-D1:

S403-D1: Use repetition points with the same attribute information as the target point in the M repetition points as target adjacent points of the target point in a case that position information of the target point is the same as that of the M repetition points.

In some embodiments, the subsequently formed code stream carries a total quantity of target adjacent points of the target point in this application.

In some embodiments, if the total quantity of target adjacent points of the target point determined above is less than K, the subsequently formed code stream carries the total quantity of target adjacent points of the target point. If the total quantity of target adjacent points of the target point is K, the subsequently formed code stream does not carry the total quantity of target adjacent points of the target point. Correspondingly, when the decoder side does not parse the total quantity of target adjacent points of the target point from the code stream, it is considered by default that the total quantity of target adjacent points of the target point is K.

In this application, by using the foregoing method, the following S404 may be performed after at least one target adjacent point of the target point is determined according to the M repetition points.

S403: Perform attribute prediction on the target point according to reconstructed attribute information of the at least one target adjacent point.

In some embodiments, if the attribute information of the target point is reflectivity information, a reflectivity predicted value of the target point is determined in the following manner:

An inverse of the Manhattan distance between the target adjacent point and the target point is used as a weight of the target adjacent point. It is assumed that the geometry coordinates of the target point are (xi, yi, zi), and the geometry coordinates of each target adjacent point are (xij, yij, zij), where j=1, 2, 3, . . . , k. It is assumed that the total quantity of target adjacent points is K, the weights of the target adjacent points are determined according to the following formula (1):

$$w_{ij} = \frac{1}{|xi - xij| + |yi - yij| + |zi - zij|} \quad (1)$$

Optionally, for the reflectivity attribute, different weights are adopted for the components in the directions x, y, and z, and the weights of the target adjacent points are determined according to the following formula (2):

$$w_{ij} = \frac{1}{a|xi - xij| + b|yi - yij| + c|zi - zij|} \quad (2)$$

where a, b, and c are preset weights of the reflectivity attribute in the directions x, y, and z respectively. Optionally, a, b, and c may be obtained by looking up a table, or may be preset fixed values.

A reflectivity predicted value $\hat{A}_i$ of the target point is determined according to the following formula (3):

$$\hat{A}_i = \frac{\sum_{j=1}^{k} w_{ij} \hat{A}_{ij}}{\sum_{j=1}^{k} w_{ij}} \quad (3)$$

where $\hat{A}_{ij}$ is an attribute reconstruction value of the target adjacent point, and if the total quantity of target adjacent points of the target point is K, j=1, 2, . . . , k.

In some embodiments, if the attribute information of the target point is color information, as shown in FIG. 5D and FIG. 5E, for example, N=6, adjacent points that are coplanar with the target point are searched for within a certain range [j-searchRange,j−1] (where an index of the target point is j)

of the encoded points, and if a coplanar encoded adjacent point is found, the weight of the coplanar adjacent point is assigned to 2; the encoded points continue to be searched for adjacent points that are collinear with the target point, and if a collinear adjacent point is found in the set of the encoded points, the weight of the collinear adjacent point is assigned to 1.

It can be seen that a weight is assigned each target adjacent point of the target point, and according to the weights assigned to the target adjacent points, the attribute reconstruction values of the target adjacent points are weighted and averaged to obtain a color attribute predicted value of the target point.

According to the method for predicting a point cloud attribute provided in this application, different selection policies for target adjacent points are designed during prediction according to the distribution of repetition points, to determine at least one target adjacent point of a target point, and attribute prediction is performed on the target point according to reconstructed attribute information of the at least one target adjacent point, thereby improving the efficiency of point cloud attribute prediction.

In some embodiments, before S401, this embodiment of this application further includes the steps of preprocessing and sorting the repetition points in the point cloud data. The preprocessing manners include, but not limited to, the following manners:

Manner 1: Points with same position information and same attribute information are removed from the point cloud data, that is, repetition points with same attribute values are removed from the point cloud data.

Manner 2: Q points with same position information and different attribute information in the point cloud data are acquired, Q being a positive integer greater than or equal to 2; and Q−1 points in the Q points are removed from the point cloud data, and a first point in the Q points is retained, an attribute value of the first point being an average value of attribute values of the Q points. In other words, only one repetition point with a different attribute value is retained, and its corresponding attribute value is obtained by calculation, for example, through arithmetic average and other methods.

Manner 3: Points with position information the same as that of the target point and time information different from that of the target point are removed from the point cloud data. For example, the repetition points are screened according to other information of the inputted point cloud data, for example, timestamp information, and the repetition points with the same timestamp as the target point are retained.

The sorting manners include, but not limited to, the following manners:

Manner 1: The original input order is maintained.

Manner 2: Sorting is performed in ascending or descending order according to attribute values of the repetition points. If there are a plurality of attribute values, sorting is performed first according to first attribute values; and if the first attribute values are the same, sorting is performed according to second attribute values. By analogy, the first attribute value may be an attribute value of the color attribute, and the second attribute value may be an attribute value of the reflectivity. If there are a plurality of repetition points with the same attribute value, the repetition points are sorted according to other possible input information or not sorted.

Manner 3: The repetition points are sorted in ascending or descending order according to a difference between the attribute value of each of the repetition points and the attribute value of the target point.

The method for predicting a point cloud attribute provided in this embodiment of this application is described above by using the encoder side as an example. The technical solution of this application is introduced below by using a decoder side as an example and using a decoding device such as the foregoing decoding device 120 as an execution entity with reference to FIG. 6.

Figure 6:
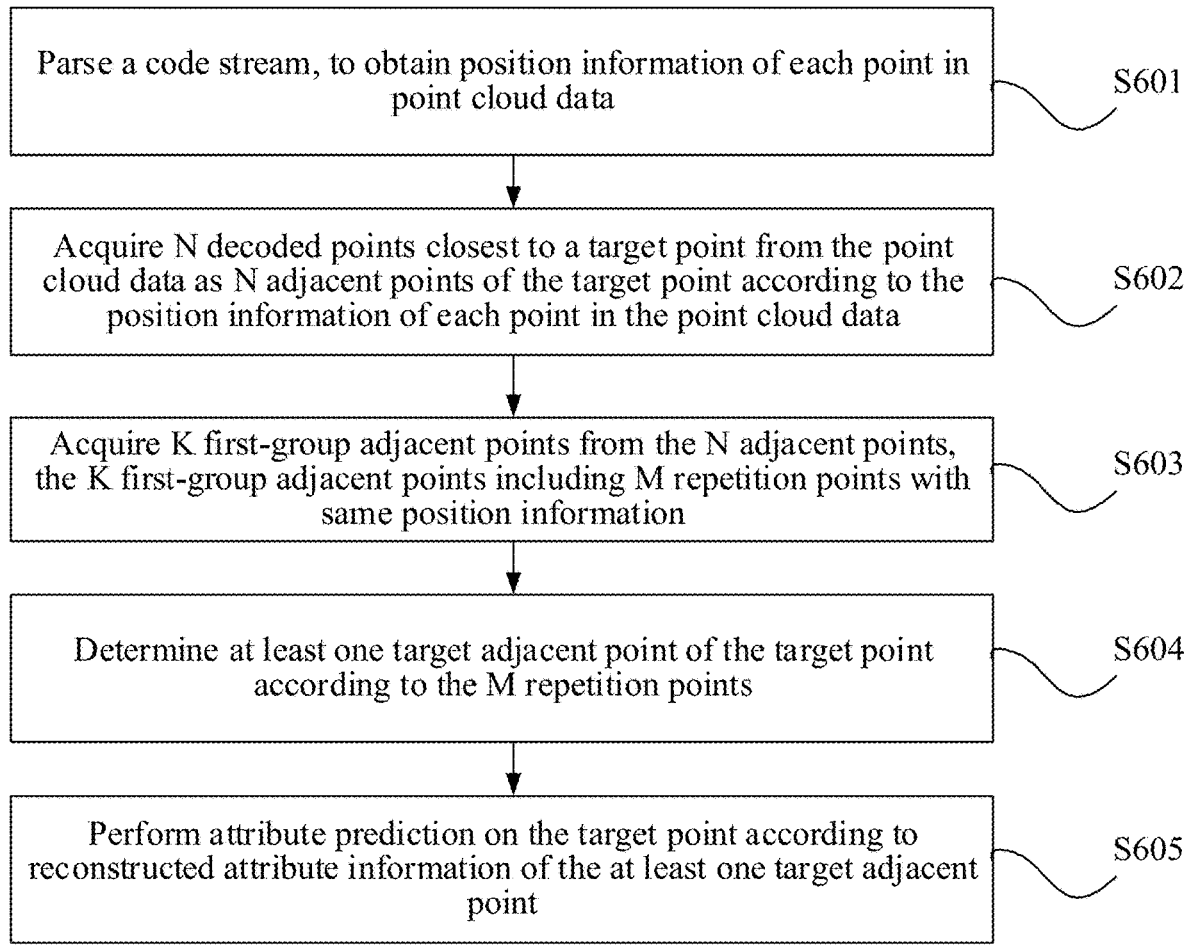
FIG. 6 is a flowchart of a method for predicting a point cloud attribute according to another embodiment of this application.

FIG. 6 is a flowchart of a method for predicting a point cloud attribute according to another embodiment of this application. as shown in FIG. 6, the method includes the following steps:

S601: Parse a code stream, to obtain position information of each point in point cloud data.

The decoder decodes a code stream, firsts decodes the position information of the point cloud, and then decodes the attribute information of the point cloud.

S602: Acquire N decoded points closest to a target point from the point cloud data as N adjacent points of the target point according to the position information of each point in the point cloud data.

For example, a distance between the target point and each point is acquired according to the position information of each point in the point cloud data and the position information of the target point, and N decoded points closest to a target point are acquired from the point cloud data as N adjacent points of the target point according to the distance between the target point and each point.

For the specific implementation process of S602, reference may be made to the detailed description of S401, Details are not described herein again.

S603: Acquire K first-group adjacent points from the N adjacent points, the K first-group adjacent points including M repetition points with same position information.

In an example, a distance between each of the N adjacent points and the target point is calculated according to position information of each of the N adjacent points and position information of the target point; and first K adjacent points with the shortest distance in the N adjacent points are used as the K first-group adjacent points.

For the specific implementation process of S603, reference may be made to the detailed description of S402, Details are not described herein again.

S604: Determine at least one target adjacent point of the target point according to the M repetition points.

In this step, the implementation process of determining at least one target adjacent point of the target point according to the M repetition points includes, but not limited to, the following manners:

In a first implementation, S604 includes the following S604-A1 and S604-A2:

S604-A1: Determine one third-group adjacent point from the M repetition points.

S604-A2: Use the third-group adjacent point as one target adjacent point of the target point.

The third-group adjacent point may be any one of the M repetition points. Because the position information of the M repetition points is the same, but the attribute information thereof may be the same or different, the attribute information of the third-group adjacent point may be determined in the following manner:

For example, an attribute value of any one of the M repetition points is used as an attribute value of the third-group adjacent point; or an average value of attribute values of all the M repetition points is used as an attribute value of the third-group adjacent point.

A code stream is parsed, and if the total quantity of target adjacent points of the target point carried in the code stream is K−M+1, in some embodiments of the first manner, the video encoder may further use K−M first-group adjacent points other than the M repetition points in the K first-group adjacent points as K−M target adjacent points of the target point.

If the total quantity of target adjacent points of the target point that is carried in the code stream is K, or the code stream does not carry information about the total quantity of target adjacent points of the target point, it is considered by default that when the total quantity of target adjacent points of the target point is K, in some embodiments of the first manner, this embodiment of this application further includes:

S604-A3: Select M−1 second-group adjacent points from the N adjacent points, the second-group adjacent point being different from the first-group adjacent point.

S604-A4: Use the M−1 second-group adjacent points as M−1 target adjacent points of the target point.

Implementations of S604-A3 include, but not limited to, the following manners:

Manner 1: M−1 adjacent points are randomly selected from N−K adjacent points other than the K first-group adjacent points in the N adjacent points as second-group adjacent points.

Manner 2: M−1 adjacent points closest to the target point are selected from N−K adjacent points as the M−1 second-group adjacent points, the N−K adjacent points being adjacent points other than the K first-group adjacent points in the N adjacent points.

In a second implementation, if each point in the point cloud data includes time information, S604 includes S604-B1 and S604-B2:

S604-B1: Parse a code stream, to obtain time information of the M repetition points and time information of the target point.

S604-B2: Select P repetition points with the same time information as the target point from the M repetition points as target adjacent points of the target point, P being a positive integer.

Based on S604-B1, if the total quantity of target adjacent points of the target point that is carried in the code stream is K, or the code stream does not carry information about the total quantity of target adjacent points of the target point, it is considered by default that when the total quantity of target adjacent points of the target point is K, this implementation may further include S604-B2:

S604-B2: Select M−P fourth-group adjacent points from the N adjacent points as M−P target adjacent points of the target point, the fourth-group adjacent point being different from the first-group adjacent point.

Implementations of S604-B2 include, but not limited to, the following manners:

Manner 1: M−P adjacent points are randomly selected from N−K adjacent points other than the K first-group adjacent points in the N adjacent points as second-group adjacent points.

Manner 2: M−P adjacent points closest to the target point are selected from N−K adjacent points as the M−P fourth-group adjacent points, the N−K adjacent points being adjacent points other than the K first-group adjacent points in the N adjacent points.

In a third implementation, S604 includes S604-C1:

S604-C1: Use first-group adjacent points other than the M repetition points in the K first-group adjacent points as K−M target adjacent points of the target point. In other words, the M repetition points are removed.

Based on S604-C1, if the total quantity of target adjacent points of the target point that is carried in the code stream is K, or the code stream does not carry information about the total quantity of target adjacent points of the target point, it is considered by default that when the total quantity of target adjacent points of the target point is K, this implementation may further include S604-C2:

S604-C2: Select M adjacent points from N−K adjacent points as M target adjacent points of the target point, the N−K adjacent points being adjacent points other than the K first-group adjacent points in the N adjacent points.

Implementations of S604-C2 include, but not limited to, the following manners:

Manner 1: M adjacent points are randomly selected from N−K adjacent points other than the K first-group adjacent points in the N adjacent points as M target adjacent points of the target point.

Manner 2: M adjacent points closest to the target point are selected from N−K adjacent points as M target adjacent points of the target point, the N−K adjacent points being adjacent points other than the K first-group adjacent points in the N adjacent points.

In a fourth implementation, S604 includes S604-D1 and S604-D2:

S604-D1: Determine whether position information of the target point is the same as that of the M repetition points.

S604-D2: Use repetition points with the same attribute information as the target point in the M repetition points as target adjacent points of the target point in a case that position information of the target point is the same as that of the M repetition points.

In some embodiments, S604-D1 includes, but not limited to, the following manners:

Manner 1: It is determined that the position information of the target point is the same as that of the M repetition points in a case that a point with the same position information as the target point exists in the M repetition points. In other words, the target point is a repetition point.

Manner 2: It is determined that the position information of the target point is the same as that of the M repetition points in a case that a repetition point flag included in the target point is the same as repetition point flags of the M repetition points. The same type of repetition points correspond to the same repetition point flag.

Manner 3: A code stream is parsed to obtain the repetition point flag of a first repetition point, and it is determined that the position information of the target point is the same as that of the M repetition points in a case that the position information of the target point is same as that of the first repetition point. Specifically, the code stream is parsed to obtain the repetition point flag of the first repetition point, the first repetition point is found according to the repetition point flag of the first repetition point, and whether the position information of the first repetition point is the same as the position information of the target point is determined. If the position information of the first repetition point is the same as the position information of the target point, it is determined that the target point is a repetition point. In this manner, it can be understood as that the first repetition point is the first repetition point in the M repetition points.

Manner 4: Because repetition points in the code stream are sorted together in sequence, the code stream is parsed to obtain the repetition point flag of a first repetition point and a quantity of repetition points, and a repetition point set is acquired according to the first repetition point and the quantity of repetition points; and it is determined that the position information of the target point is same as that of the M repetition points in a case that the target point belongs to the repetition point set. The M repetition points may also belong to the repetition point set.

The repetition point flags and the quantity of repetition points may be carried in attachment information in a sequence parameter set (SPS), or a geometry parameter set (GPS), or an attribute parameter set (APS).

In some embodiments, the code stream in this application carries a total quantity of target adjacent points of the target point.

In some embodiments, when the total quantity of target adjacent points of the target point is not parsed from the code stream, it is considered by default that the total quantity of target adjacent points of the target point is K.

In this application, by using the foregoing method, the following S605 may be performed after at least one target adjacent point of the target point is determined according to the M repetition points.

S605: Perform attribute prediction on the target point according to reconstructed attribute information of the at least one target adjacent point.

N, K, and M are all positive integers greater than or equal to 1.

For the specific implementation process of S605, reference may be made to the detailed description of S404, Details are not described herein again.

It is to be understood that the method for predicting a point cloud attribute 600 is an inverse process of the method for predicting a point cloud attribute 400. For steps in the method for predicting a point cloud attribute 600, reference may be made to corresponding steps in the method for predicting a point cloud attribute 400. To avoid repetition, details are not described herein again.

The exemplary implementations of this application are described in detail above with reference to the accompanying drawings. However, this application is not limited to the specific details in the foregoing implementations. In the scope of the technical idea of this application, various simple variants can be made on the technical solution of this application, and the simple variants all belong to the protection scope of this application. For example, the specific technical features described in the above specific implementations may be combined in any suitable manner without contradiction. To avoid unnecessary repetition, various possible combinations are not further described in this application. In another example, the various implementations of this application may be combined without departing from the idea of this application, and such combinations shall also fall within the scope of this application.

It is to be further understood that sequence numbers of the foregoing processes do not mean execution sequences in various method embodiments of this application. The execution sequences of the processes shall be determined according to functions and internal logic of the processes, and shall not be construed as any limitation on the implementation processes of the embodiments of this application.

The method embodiments of this application are described above in details with reference to FIG. 1 to FIG. 6, and the apparatus embodiments of this application are described below in details with reference to FIG. 7 and FIG. 8.

Figure 7:
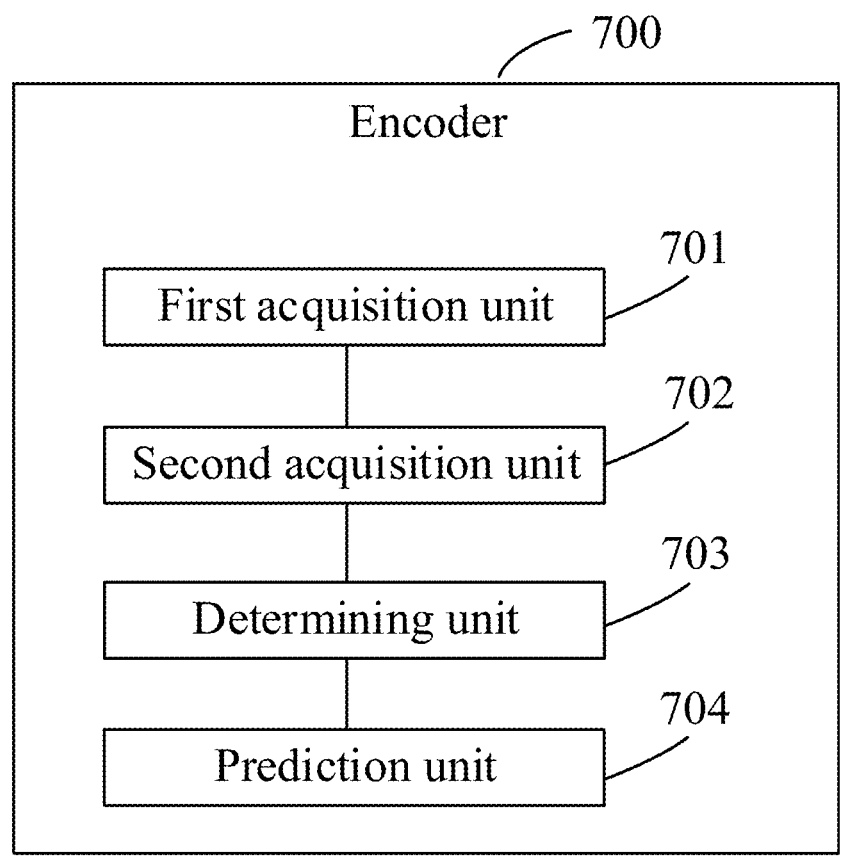
FIG. 7 is a schematic block diagram of an encoder according to an embodiment of this application.

FIG. 7 is a schematic block diagram of an encoder according to an embodiment of this application.

As shown in FIG. 7, the encoder 700 may include:
a first acquisition unit 701, configured to acquire N encoded points closest to a target point from points included in point cloud data as N adjacent points of the target point;
a second acquisition unit 702, configured to acquire K first-group adjacent points from the N adjacent points, the K first-group adjacent points including M repetition points with same position information;
a determining unit 703, configured to determine at least one target adjacent point of the target point according to the M repetition points; and
a prediction unit 704, configured to perform attribute prediction on the target point according to reconstructed attribute information of the at least one target adjacent point,
N, K, and M are all positive integers greater than or equal to 1.

In some embodiments, the determining unit 703 is specifically configured to: determine one third-group adjacent point from the M repetition points; and use the third-group adjacent point as one target adjacent point of the target point.

In some embodiments, the determining unit 703 is further configured to: use an attribute value of any one of the M repetition points as an attribute value of the third-group adjacent point; or use an average value of attribute values of all the M repetition points as an attribute value of the third-group adjacent point.

In some embodiments, the determining unit 703 is further configured to: use K–M first-group adjacent points other than the M repetition points in the K first-group adjacent points as K–M target adjacent points of the target point.

In some embodiments, the determining unit 703 is further configured to: select M–1 second-group adjacent points from the N adjacent points, the second-group adjacent point being different from the first-group adjacent point; and use the M–1 second-group adjacent points as M–1 target adjacent points of the target point.

In some embodiments, the determining unit 703 is further configured to: select M–1 adjacent points closest to the target point from N–K adjacent points as the M–1 second-group adjacent points, the N–K adjacent points being adjacent points other than the K first-group adjacent points in the N adjacent points.

In some embodiments, the determining unit 703 is specifically configured to: select P repetition points with the same time information as the target point from the M repetition points as target adjacent points of the target point, P being a positive integer.

In some embodiments, the determining unit 703 is further configured to: select M–P fourth-group adjacent points from the N adjacent points as M–P target adjacent points of the target point, the fourth-group adjacent point being different from the first-group adjacent point.

In some embodiments, the determining unit 703 is further configured to: select M–P adjacent points closest to the target point from N–K adjacent points as the M–P fourth-group adjacent points, the N–K adjacent points being adjacent points other than the K first-group adjacent points in the N adjacent points.

In some embodiments, the determining unit 703 is specifically configured to: use first-group adjacent points other than the M repetition points in the K first-group adjacent points as K–M target adjacent points of the target point.

In some embodiments, the determining unit 703 is further configured to: select M adjacent points from N–K adjacent points as M target adjacent points of the target point, the N–K adjacent points being adjacent points other than the K first-group adjacent points in the N adjacent points.

In some embodiments, the determining unit 703 is specifically configured to: use repetition points with the same attribute information as the target point in the M repetition points as target adjacent points of the target point in a case that position information of the target point is the same as that of the M repetition points.

In some embodiments, the second acquisition unit 702 is specifically configured to: determine a distance between each of the N adjacent points and the target point according to position information of each of the N adjacent points and position information of the target point; and use first K adjacent points with the shortest distance in the N adjacent points as the K first-group adjacent points.

In some embodiments, the first acquisition unit 701 is further configured to: acquire Q points with same position information and different attribute information in the point cloud data, Q being a positive integer greater than or equal to 2; and remove Q–1 points in the Q points from the point cloud data, and retaining a first point in the Q points, an attribute value of the first point being an average value of attribute values of the Q points.

In some embodiments, the first acquisition unit 701 is further configured to: remove points with same position information and same attribute information from the point cloud data.

In some embodiments, the first acquisition unit 701 is further configured to: remove points with position information the same as that of the target point and time information different from that of the target point from the point cloud data.

In some embodiments, the first acquisition unit 701 is further configured to: sort repetition points with the same position information in the point cloud data according to attribute values.

In some embodiments, the prediction unit 704 is further configured to: generate an attribute code stream, the attribute code stream carrying a total quantity of target adjacent points of the target point.

It is to be understood that the apparatus embodiments and the method embodiments may correspond to each other, and for similar descriptions, reference may be made to the method embodiments. To avoid repetition, details are not described herein again. Specifically, the apparatus 700 shown in FIG. 7 can perform the embodiments of the foregoing method 400, and the foregoing other operations and/or functions of modules in the apparatus 700 are respectively for implementing the method embodiments corresponding to the encoder. For brevity, details are not described herein again.

The apparatus 700 in this embodiment of this application is described above from the perspective of functional modules with reference to the accompanying drawings. It is to be understood that the functional modules may be implemented in the form of hardware, may be implemented by instructions in the form of software, or may be implemented by a combination of software and hardware. Specifically, the steps of the method embodiments in the embodiments of this application may be completed by a hardware integrated logical circuit in a processor, or by using instructions in a form of software. The steps of the methods disclosed with reference to the embodiments of this application may be directly performed and completed by using a hardware decoding processor, or may be performed and completed by using a combination of hardware and software modules in the decoding processor. Optionally, the software modules may be located in a mature storage medium in the field, such as a random access memory, a flash memory, a read-only memory, a programmable read-only memory, an electrically-erasable programmable memory, or a register. The storage medium is located in the memory. The processor reads information in the memory and completes the steps of the foregoing method embodiments in combination with hardware thereof.

Figure 8:
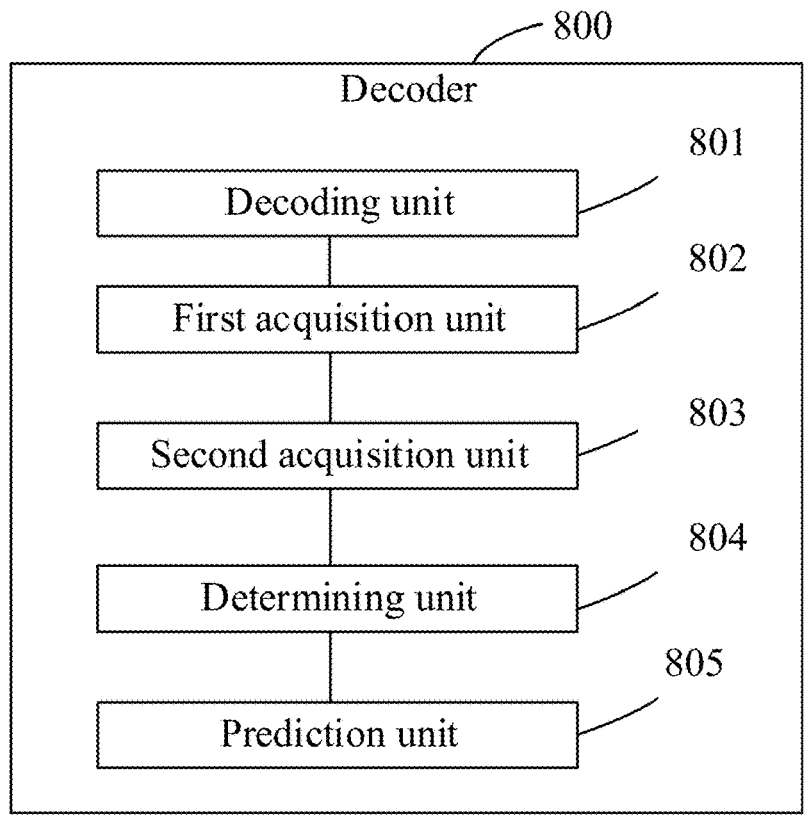
FIG. 8 is a schematic block diagram of a decoder according to an embodiment of this application.

FIG. 8 is a schematic block diagram of a decoder according to an embodiment of this application.

As shown in FIG. 8, the decoder 800 may include:
- a decoding unit 801, configured to parse a code stream, to obtain position information of each point in point cloud data;
- a first acquisition unit 802, configured to acquire N decoded points closest to a target point from the point cloud data as N adjacent points of the target point according to the position information of each point in the point cloud data;
- a second acquisition unit 803, configured to acquire K first-group adjacent points from the N adjacent points, the K first-group adjacent points including M repetition points with same position information;
- a determining unit 804, configured to determine at least one target adjacent point of the target point according to the M repetition points; and
- a prediction unit 805, configured to perform attribute prediction on the target point according to reconstructed attribute information of the at least one target adjacent point, N, K, and M are all positive integers greater than or equal to 1.

In some embodiments, the determining unit 804 is specifically configured to: determine one third-group adjacent point from the M repetition points; and use the third-group adjacent point as one target adjacent point of the target point.

In some embodiments, the determining unit 804 is further configured to: use an attribute value of any one of the M repetition points as an attribute value of the third-group adjacent point; or use an average value of attribute values of all the M repetition points as an attribute value of the third-group adjacent point.

In some embodiments, the determining unit 804 is further configured to: use K–M first-group adjacent points other than the M repetition points in the K first-group adjacent points as K–M target adjacent points of the target point.

In some embodiments, the determining unit 804 is further configured to: select M–1 second-group adjacent points from the N adjacent points, the second-group adjacent point being different from the first-group adjacent point; and use the M–1 second-group adjacent points as M–1 target adjacent points of the target point.

In some embodiments, the determining unit 804 is further configured to: select M–1 adjacent points closest to the target point from N–K adjacent points as the M–1 second-group adjacent points, the N–K adjacent points being adjacent points other than the K first-group adjacent points in the N adjacent points.

In some embodiments, the determining unit 804 is specifically configured to: parse a code stream, to obtain time information of the M repetition points and time information of the target point; and select P repetition points with the same time information as the target point from the M repetition points as target adjacent points of the target point, P being a positive integer.

In some embodiments, the determining unit 804 is further configured to: select M–P fourth-group adjacent points from the N adjacent points as M−P target adjacent points of the target point, the fourth-group adjacent point being different from the first-group adjacent point.

In some embodiments, the determining unit 804 is specifically configured to: select M−P adjacent points closest to the target point from N−K adjacent points as the M−P fourth-group adjacent points, the N−K adjacent points being adjacent points other than the K first-group adjacent points in the N adjacent points.

In some embodiments, the determining unit 804 is specifically configured to: use first-group adjacent points other than the M repetition points in the K first-group adjacent points as K−M target adjacent points of the target point.

In some embodiments, the determining unit 804 is further configured to: select M adjacent points from N−K adjacent points as M target adjacent points of the target point, the N−K adjacent points being adjacent points other than the K first-group adjacent points in the N adjacent points.

In some embodiments, the determining unit 804 is further configured to: determine whether position information of the target point is the same as that of the M repetition points; and use repetition points with the same attribute information as the target point in the M repetition points as target adjacent points of the target point in a case that it is determined that the position information of the target point is the same as that of the M repetition points.

In some embodiments, the determining unit 804 is specifically configured to: determine that the position information of the target point is the same as that of the M repetition points in a case that a point with the same position information as the target point exists in the M repetition points; or determine that the position information of the target point is the same as that of the M repetition points in a case that a repetition point flag included in the target point is the same as repetition point flags of the M repetition points; or parse a code stream to obtain the repetition point flag of a first repetition point, and determine that the position information of the target point is the same as that of the M repetition points in a case that the position information of the target point is same as that of the first repetition point; or parse a code stream to obtain the repetition point flag of a first repetition point and a quantity of repetition points, and acquire a repetition point set according to the first repetition point and the quantity of repetition points, repetition points in the code stream being sorted together in sequence; and determine that the position information of the target point is same as that of the M repetition points in a case that the target point belongs to the repetition point set.

It is to be understood that the apparatus embodiments and the method embodiments may correspond to each other, and for similar descriptions, reference may be made to the method embodiments. To avoid repetition, details are not described herein again. Specifically, the apparatus 800 shown in FIG. 8 can perform the embodiments of the method 600, and the foregoing other operations and/or functions of modules in the apparatus 800 are respectively for implementing the method embodiments corresponding to the decoder. For brevity, details are not described herein again.

The apparatus 800 in this embodiment of this application is described above from the perspective of functional modules with reference to the accompanying drawings. It is to be understood that the functional modules may be implemented in the form of hardware, may be implemented by instructions in the form of software, or may be implemented by a combination of software and hardware. Specifically, the steps of the method embodiments in the embodiments of this application may be completed by a hardware integrated logical circuit in a processor, or by using instructions in a form of software. The steps of the methods disclosed with reference to the embodiments of this application may be directly performed and completed by using a hardware decoding processor, or may be performed and completed by using a combination of hardware and software modules in the decoding processor. Optionally, the software modules may be located in a mature storage medium in the field, such as a random access memory, a flash memory, a read-only memory, a programmable read-only memory, an electrically-erasable programmable memory, or a register. The storage medium is located in the memory. The processor reads information in the memory and completes the steps of the foregoing method embodiments in combination with hardware thereof.

Figure 9:
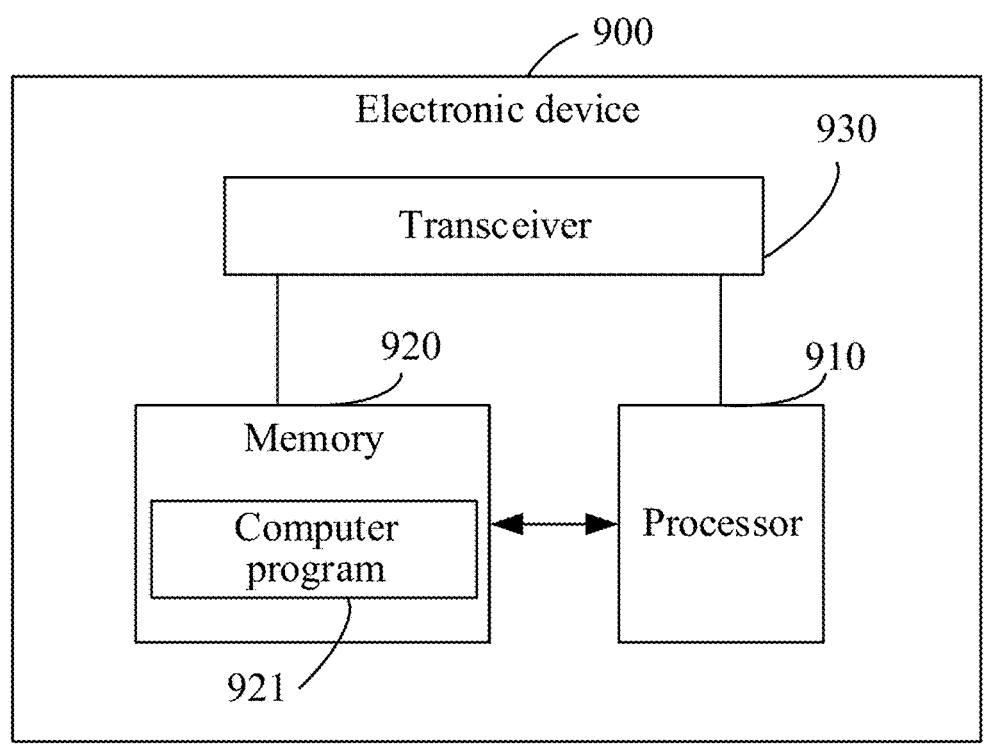
FIG. 9 is a schematic block diagram of an electronic device according to an embodiment of this application.

FIG. 9 is a schematic block diagram of an electronic device 900 according to an embodiment of this application. The electronic device in FIG. 9 may be the foregoing video encoder or video decoder.

As shown in FIG. 9, the electronic device 900 may include:

a memory 910 and a processor 920, the memory 910 being configured to store a computer program 911, and transmit the computer program 911 to the processor 920. In other words, the processor 920 may invoke the computer program 911 from the memory 910 and run the computer program, to implement the method in the embodiments of this application.

For example, the processor 920 may be configured to perform the steps in the foregoing method 200 according to instructions in the computer program 911.

In some embodiments of this application, the processor 920 may include, but not limited to:

a general purpose processor, a digital signal processor (DSP), an application-specific integrated circuit (ASIC), a field-programmable gate array (FPGA) or another programmable logic device, a discrete gate or a transistor logic device, or a discrete hardware component.

In some embodiments of this application, the memory 910 includes, but not limited to:

a volatile memory and/or a non-volatile memory. The non-volatile memory may be a read-only memory (ROM), a programmable ROM (PROM), an erasable programmable read-only memory (EPROM), an electrically EPROM (EEPROM), or a flash memory. The volatile memory may be a random access memory (RAM), and is used as an external cache. Through exemplary but not limitative description, many forms of RAMs may be used, for example, a static random access memory (SRAM), a dynamic random access memory (DRAM), a synchronous dynamic random access memory (SDRAM), a double data rate synchronous dynamic random access memory (DDR SDRAM), an enhanced synchronous dynamic random access memory (ESDRAM), a synchlink dynamic random access memory (SLDRAM) and a direct rambus random access memory (DR RAM).

In some embodiments of this application, the computer program 911 may be divided into one or more modules, and the one or more modules are stored in the memory 910 and executed by the processor 920 to implement the method for predicting a point cloud attribute provided in this application. The one or more modules may be a series of computer program instruction segments capable of implementing specific functions, and the instruction segments are used for describing the execution process of the computer program 911 in the electronic device 900.

As shown in FIG. 9, the electronic device 900 may further include:

a transceiver 930. The transceiver 930 may be connected to the processor 920 or the memory 910.

The processor 920 may control the transceiver 930 to communicate with another device and specifically may send information or data to another device or receive information or data sent by another device. The transceiver 930 may include a transmitter and a receiver. The transceiver 930 may further include an antenna, and a quantity of the antenna can be one or more.

It is to be understood that components in the electronic device 900 are connected by a bus system. In addition to a data bus, the bus system may further include a power bus, a control bus, and a status signal bus.

According to an aspect of this application, a computer storage medium is provided, storing a computer program, the computer program, when executed by a computer, causing the computer to be capable of performing the method in the foregoing method embodiments. Alternatively, an embodiment of this application further provides a computer program product including instructions, the instructions, when executed by a computer, causing the computer to perform the method in the foregoing method embodiments.

According to another aspect of this application, a computer program product or a computer program is provided, the computer program product or the computer program including computer instructions, the computer instructions being stored in a computer-readable storage medium. A processor of a computer device reads the computer instructions from the computer-readable storage medium and executes the computer instructions to cause the computer device to perform the method in the foregoing method embodiments.

In other words, when software is used to implement the embodiments, the embodiments may be implemented completely or partially in a form of a computer program product. The computer program product includes one or more computer instructions. When the computer program instructions are loaded and executed on the computer, the procedures or functions according to the embodiments of this application are all or partially generated. The computer may be a general-purpose computer, a special-purpose computer, a computer network, or another programmable apparatus. The computer instructions may be stored in a computer-readable storage medium, or transmitted from one computer-readable storage medium to another computer-readable storage medium. For example, the computer instructions may be transmitted from one website, computer, server, or data center to another website, computer, server, or data center in a wired (for example, a coaxial cable, an optical fiber, or a digital subscriber line (DSL)) or wireless (for example, infrared, radio, or microwave) manner. The computer-readable storage medium may be any usable medium accessible by a computer, or a data storage device, such as a server or a data center, integrating one or more usable media. The available medium may be a magnetic medium (for example, a floppy disk, a hard disk, or a tape), an optical medium (for example, a digital video disc (DVD)), or a semi-conductive medium (for example, a solid state disk (SSD)).

A person of ordinary skill in the art may notice that the exemplary modules and algorithm steps described with reference to the embodiments disclosed in this specification can be implemented in electronic hardware, or a combination of computer software and electronic hardware. Whether the functions are executed in a mode of hardware or software depends on particular applications and design constraint conditions of the technical solutions. A person skilled in the art may use different methods to implement the described functions for each particular application, but it is not to be considered that the implementation goes beyond the scope of this application.

In the several embodiments provided in this application, it is to be understood that the disclosed system, apparatus, and method may be implemented in other manners. For example, the described apparatus embodiments are merely examples. For example, division of the modules is merely logical function division and may be other division manners during actual implementation. For example, a plurality of modules or components may be combined or integrated into another system, or some features may be ignored or not performed. In addition, the displayed or discussed mutual couplings or direct couplings or communication connections may be implemented by using some interfaces. The indirect couplings or communication connections between the apparatuses or modules may be implemented in electronic, mechanical, or other forms.

The modules described as separate components may or may not be physically separated, and the components displayed as modules may or may not be physical modules, i.e., may be located in one place or may be distributed over multiple network units. Some or all of the modules may be selected according to actual requirements to implement the objectives of the solutions of the embodiments. For example, functional modules in the embodiments of this application may be integrated into one processing module, or each of the modules may exist alone physically, or two or more modules may be integrated into one module.

In various embodiments in the present disclosure, a unit may refer to a software unit, a hardware unit, or a combination thereof. A software unit may include a computer program or part of the computer program that has a predefined function and works together with other related parts to achieve a predefined goal, such as those functions described in this disclosure. A hardware unit may be implemented using processing circuitry and/or memory configured to perform the functions described in this disclosure. Each unit can be implemented using one or more processors (or processors and memory). Likewise, a processor (or processors and memory) can be used to implement one or more units. Moreover, each unit can be part of an overall unit that includes the functionalities of the unit. The description here also applies to the term unit and other equivalent terms.

In various embodiments in the present disclosure, a module may refer to a software module, a hardware module, or a combination thereof. A software module may include a computer program or part of the computer program that has a predefined function and works together with other related parts to achieve a predefined goal, such as those functions described in this disclosure. A hardware module may be implemented using processing circuitry and/or memory configured to perform the functions described in this disclosure. Each module can be implemented using one or more processors (or processors and memory). Likewise, a processor (or processors and memory) can be used to implement one or more modules. Moreover, each module can be part of an overall module that includes the functionalities of the module. The description here also applies to the term module and other equivalent terms.

The foregoing descriptions are merely specific implementations of this application, but are not intended to limit the protection scope of this application. Any variation or replacement readily figured out by a person skilled in the art within the technical scope disclosed in this application shall fall within the protection scope of this application. Therefore, the protection scope of this application shall be subject to the protection scope of the claims.

What is claimed is:

1. A method for predicting a point cloud attribute, the method comprising:
acquiring, by a device comprising a memory storing instructions and a processor in communication with the memory, N encoded points closest to a target point from point cloud data as N adjacent points of the target point, the target point being one of points in the point cloud data;
acquiring, by the device, K first-group adjacent points from the N adjacent points, the K first-group adjacent points comprising M repetition points with same position information;
determining, by the device, at least one target adjacent point of the target point according to the M repetition points; and
performing, by the device, attribute prediction on the target point according to reconstructed attribute information of the at least one target adjacent point,
wherein each of N, K, and M is a positive integer.

2. The method according to claim 1, further comprising:
using K−M first-group adjacent points other than the M repetition points in the K first-group adjacent points as K−M target adjacent points of the target point.

3. The method according to claim 1, wherein the determining the at least one target adjacent point of the target point according to the M repetition points comprises:
determining one third-group adjacent point from the M repetition points; and
using the third-group adjacent point as one target adjacent point of the target point.

4. The method according to claim 3, further comprising:
using an attribute value of any one of the M repetition points as an attribute value of the third-group adjacent point; or
using an average value of attribute values of all the M repetition points as an attribute value of the third-group adjacent point.

5. The method according to claim 3, further comprising:
selecting M−1 second-group adjacent points from the N adjacent points, the M−1 second-group adjacent points being different from the K first-group adjacent points; and
using the M−1 second-group adjacent points as M−1 target adjacent points of the target point.

6. The method according to claim 5, wherein the selecting M−1 second-group adjacent points from the N adjacent points comprises:
selecting M−1 adjacent points closest to the target point from N−K adjacent points as the M−1 second-group adjacent points, the N−K adjacent points being adjacent points other than the K first-group adjacent points in the N adjacent points.

7. The method according to claim 1, wherein the acquiring K first-group adjacent points from the N adjacent points comprises:
determining a distance between each of the N adjacent points and the target point according to position information of each of the N adjacent points and position information of the target point; and
using first K adjacent points with the shortest distance in the N adjacent points as the K first-group adjacent points.

8. An apparatus for predicting a point cloud attribute, the apparatus comprising:
a memory storing instructions; and
a processor in communication with the memory, wherein, when the processor executes the instructions, the processor is configured to cause the apparatus to perform:
acquiring N encoded points closest to a target point from point cloud data as N adjacent points of the target point, the target point being one of points in the point cloud data;
acquiring K first-group adjacent points from the N adjacent points, the K first-group adjacent points comprising M repetition points with same position information;
determining at least one target adjacent point of the target point according to the M repetition points; and
performing attribute prediction on the target point according to reconstructed attribute information of the at least one target adjacent point,
wherein each of N, K, and M is a positive integer.

9. The apparatus according to claim 8, wherein, when the processor executes the instructions, the processor is configured to further cause the apparatus to perform:
using K−M first-group adjacent points other than the M repetition points in the K first-group adjacent points as K−M target adjacent points of the target point.

10. The apparatus according to claim 8, wherein, when the processor is configured to cause the apparatus to perform determining the at least one target adjacent point of the target point according to the M repetition points, the processor is configured to cause the apparatus to perform:
determining one third-group adjacent point from the M repetition points; and
using the third-group adjacent point as one target adjacent point of the target point.

11. The apparatus according to claim 10, wherein, when the processor executes the instructions, the processor is configured to further cause the apparatus to perform:
using an attribute value of any one of the M repetition points as an attribute value of the third-group adjacent point; or
using an average value of attribute values of all the M repetition points as an attribute value of the third-group adjacent point.

12. The apparatus according to claim 10, wherein, when the processor executes the instructions, the processor is configured to further cause the apparatus to perform:
selecting M−1 second-group adjacent points from the N adjacent points, the M−1 second-group adjacent points being different from the K first-group adjacent points; and
using the M−1 second-group adjacent points as M−1 target adjacent points of the target point.

13. The apparatus according to claim 12, wherein, when the processor is configured to cause the apparatus to perform selecting M−1 second-group adjacent points from the N adjacent points, the processor is configured to cause the apparatus to perform:
selecting M−1 adjacent points closest to the target point from N−K adjacent points as the M−1 second-group adjacent points, the N−K adjacent points being adjacent points other than the K first-group adjacent points in the N adjacent points.

14. The apparatus according to claim 8, wherein, when the processor is configured to cause the apparatus to perform acquiring K first-group adjacent points from the N adjacent points, the processor is configured to cause the apparatus to perform:
- determining a distance between each of the N adjacent points and the target point according to position information of each of the N adjacent points and position information of the target point; and
- using first K adjacent points with the shortest distance in the N adjacent points as the K first-group adjacent points.

15. A non-transitory computer-readable storage medium, configured to store computer-readable instructions, wherein, the computer-readable instructions, when executed by a processor, are configured to cause the processor to perform:
- acquiring N encoded points closest to a target point from point cloud data as N adjacent points of the target point, the target point being one of points in the point cloud data;
- acquiring K first-group adjacent points from the N adjacent points, the K first-group adjacent points comprising M repetition points with same position information;
- determining at least one target adjacent point of the target point according to the M repetition points; and
- performing attribute prediction on the target point according to reconstructed attribute information of the at least one target adjacent point, wherein each of N, K, and M is a positive integer.

16. The non-transitory computer-readable storage medium according to claim 15, wherein, when the computer-readable instructions are executed by the processor, the computer-readable instructions are configured to further cause the processor to perform:
- using K−M first-group adjacent points other than the M repetition points in the K first-group adjacent points as K−M target adjacent points of the target point.

17. The non-transitory computer-readable storage medium according to claim 15, wherein, when the computer-readable instructions are configured to cause the processor to perform determining the at least one target adjacent point of the target point according to the M repetition points, the computer-readable instructions are configured to cause the processor to perform:
- determining one third-group adjacent point from the M repetition points; and
- using the third-group adjacent point as one target adjacent point of the target point.

18. The non-transitory computer-readable storage medium according to claim 17, wherein, when the computer-readable instructions are executed by the processor, the computer-readable instructions are configured to further cause the processor to perform:
- using an attribute value of any one of the M repetition points as an attribute value of the third-group adjacent point; or
- using an average value of attribute values of all the M repetition points as an attribute value of the third-group adjacent point.

19. The non-transitory computer-readable storage medium according to claim 17, wherein, when the computer-readable instructions are executed by the processor, the computer-readable instructions are configured to further cause the processor to perform:
- selecting M−1 second-group adjacent points from the N adjacent points, the M−1 second-group adjacent points being different from the K first-group adjacent points; and
- using the M−1 second-group adjacent points as M−1 target adjacent points of the target point.

20. The non-transitory computer-readable storage medium according to claim 19, wherein, when the computer-readable instructions are configured to cause the processor to perform selecting M−1 second-group adjacent points from the N adjacent points, the computer-readable instructions are configured to cause the processor to perform:
- selecting M−1 adjacent points closest to the target point from N−K adjacent points as the M−1 second-group adjacent points, the N−K adjacent points being adjacent points other than the K first-group adjacent points in the N adjacent points.

* * * * *